United States Patent
Haupt

(10) Patent No.: US 8,865,287 B2
(45) Date of Patent: Oct. 21, 2014

(54) RAPID CURING ALDEHYDE RESIN-POLYISOCYANATE COMPOSITION AND METHOD FOR PRODUCING HYBRID POLYMER

(76) Inventor: Robert A. Haupt, Christiansburg, VA (US)

( * ) Notice: Subject to any disclaimer, the term of this patent is extended or adjusted under 35 U.S.C. 154(b) by 0 days.

(21) Appl. No.: 13/058,702

(22) PCT Filed: Aug. 12, 2009

(86) PCT No.: PCT/US2009/053552
§ 371 (c)(1),
(2), (4) Date: Feb. 11, 2011

(87) PCT Pub. No.: WO2010/019666
PCT Pub. Date: Feb. 18, 2010

(65) Prior Publication Data
US 2011/0151180 A1 Jun. 23, 2011

Related U.S. Application Data

(60) Provisional application No. 61/088,652, filed on Aug. 13, 2008.

(51) Int. Cl.
| | | |
|---|---|---|
| B32B 21/08 | (2006.01) |
| C09D 175/00 | (2006.01) |
| C09D 197/02 | (2006.01) |
| C09D 101/00 | (2006.01) |
| B32B 5/12 | (2006.01) |
| B05D 5/10 | (2006.01) |
| B05D 7/24 | (2006.01) |
| B05D 1/36 | (2006.01) |
| B05D 5/00 | (2006.01) |
| B05D 3/00 | (2006.01) |
| C08G 18/76 | (2006.01) |
| C08G 18/54 | (2006.01) |
| C08G 18/28 | (2006.01) |
| C08F 283/00 | (2006.01) |
| B32B 5/16 | (2006.01) |

(52) U.S. Cl.
CPC ........ *C08F 283/006* (2013.01); *C08G 18/7664* (2013.01); *C08G 18/542* (2013.01); *C08G 18/2885* (2013.01); *B32B 5/16* (2013.01)
USPC ........... 428/106; 524/871; 524/872; 524/874; 524/702; 524/733; 428/425.1; 427/207.1; 427/331

(58) Field of Classification Search
CPC ......... B32B 21/08; C09D 175/00; B05D 5/10
See application file for complete search history.

(56) References Cited

U.S. PATENT DOCUMENTS 4,546,039 A * 10/1985 Horacek et al. ................ 428/357
4,609,513 A * 9/1986 Israel ............................ 264/122

(Continued)

OTHER PUBLICATIONS

PCT/US09/53552, Feb. 15, 2011, WIPO-PCT IPRP (PCT/IB/373).

(Continued)

*Primary Examiner* — Randy Gulakowski
*Assistant Examiner* — Jeffrey Washville
(74) *Attorney, Agent, or Firm* — Crawford Maunu PLLC

(57) ABSTRACT

A hybrid polymer composition and a method for forming it is provided, comprising a first part A comprising a polyurethane catalyst and an aldehyde resin pre-polymer and a second part B comprising a polyisocyanate pre-polymer and an aldehyde resin cure accelerator. Methods are also provided for forming a composite with a two part hybrid polymer composition and a fibrous web material.

13 Claims, 5 Drawing Sheets

A in B microencapsulation

Component A    Interfacial Region    Component B

(56) References Cited

U.S. PATENT DOCUMENTS

| | | | |
|---|---|---|---|
| 4,699,824 A * | 10/1987 | Pufahl | 428/220 |
| 4,831,067 A | 5/1989 | Lemon et al. | |
| 4,850,849 A | 7/1989 | Hsu | |
| 4,961,795 A | 10/1990 | Detlefsen et al. | |
| 4,977,231 A | 12/1990 | McVay et al. | |
| 5,001,190 A * | 3/1991 | Carpenter et al. | 524/871 |
| 5,074,946 A | 12/1991 | Daisy | |
| 5,140,086 A | 8/1992 | Hunter et al. | |
| 5,179,143 A * | 1/1993 | Konig et al. | 524/35 |
| 5,580,922 A | 12/1996 | Park et al. | |
| 6,150,492 A | 11/2000 | Phillips et al. | |
| 6,214,265 B1 | 4/2001 | Rosthauser et al. | |
| 6,224,800 B1 | 5/2001 | Rosthauser | |
| 6,294,117 B1 | 9/2001 | Rosthauser et al. | |
| 6,297,313 B1 * | 10/2001 | Hsu | 524/542 |
| 6,416,696 B1 | 7/2002 | Miller et al. | |
| 6,432,254 B1 | 8/2002 | Black et al. | |
| 6,608,162 B1 | 8/2003 | Chiu et al. | |
| 7,049,387 B2 | 5/2006 | Dupre, Jr. | |
| 7,097,734 B2 | 8/2006 | Hill | |
| 2006/0073334 A1 * | 4/2006 | Schwantes et al. | 428/402.2 |
| 2006/0182979 A1 | 8/2006 | Dion | |
| 2007/0102108 A1 | 5/2007 | Zheng et al. | |

OTHER PUBLICATIONS

Novel Isocyanate-Reactive Adhesives for Structural Wood Based Composites (LV). "Development of a novel adhesive for cold-press production of Laminated Veneer Lumber (LVL)." ITP—Forest Products Peer Review (Apr. 5-6, 2006), 27 pgs.

Jun Zheng. "Studies of PF Resole/Isocyanate Hybrid Adhesives." Dissertation, Virginia Polytechnic Institute and State University (Dec. 2002), p. 1-198.

W. Preechatiwong et al. "Effects of phenol-formaldehyde/isocyanate hybrid adhesives on properties of oriented strand lumber (OSL) from rubberwood waste." J. Sci. Technol., vol. 29, No. 5 (Oct. 5, 2007), pp. 1367-1375.

* cited by examiner

Figure 1A – A in B microencapsulation

Figure 1B – B in A microencapsulation

Figure 2

Microencapsulated Particles

Component A

Component A Feed Channel

Component B

Microbore Tubing

Ultrasonic Atomizing Surface

Component B Feed Channel

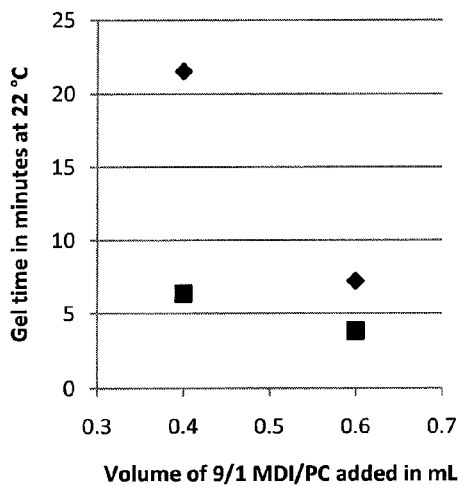
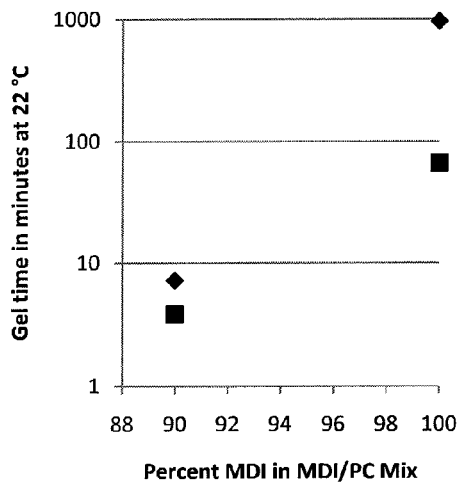
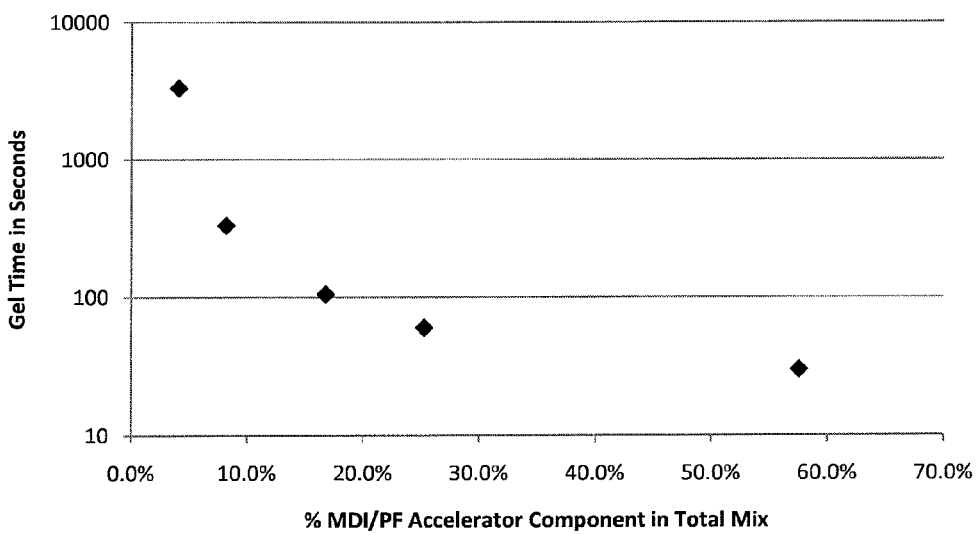

Synergistic Effect of MDI with PC accelerator on the gel time of 1.0 mL PF resin with added $NH_3$ polyurethane catalyst

RAPID CURING ALDEHYDE RESIN-POLYISOCYANATE COMPOSITION AND METHOD FOR PRODUCING HYBRID POLYMER

RELATED PATENT DOCUMENTS

This patent document is the national stage filing under 35 U.S.C. §371 of International Application No. PCT/US2009/053552 filed on Aug. 12, 2009, which claims the benefit, under 35 U.S.C. §119(e), of U.S. Provisional Patent Application Ser. No. 61/088,652 filed on Aug. 13, 2008, each of these patent documents is fully incorporated herein by reference.

FIELD OF THE INVENTION

The field of the invention relates to aldehyde prepolymer resins, polyisocyanate prepolymer resins, and hybrid polymers made from them that are useful for adhesive binders, coatings, and composite materials.

BACKGROUND

Aldehyde and polyisocyanate pre-polymer resins are generally known materials useful for coatings, binders, and other materials. Aldehyde base pre-polymer resins are usually made from formaldehyde, though other aldehydes may be used, in combination with other synthetic materials like urea, melamine, phenol, resorcinol, furfural, and natural materials like lignin, tannin, protein or amino acids, or various combinations of any of them. Isocyanate based pre-polymer resins may comprise aromatic isocyanates like toluene diisocyanate (TDI) or diphenyl methane diisocyanate (MDI), while aliphatic isocyanates may comprise hexamethylene diisocyanate (HDI), isophorone diisocyanate (IPDI), or hydrogenated MDI ($H_{12}$-MDI), or combinations of any of them. Aldehyde and isocyanate pre-polymer resins find broad usage in various applications such as wood composites, paper impregnation, fibrous composites, ceramic composites, foundry binders, insulation foams, and coatings among others.

Pre-polymer resins and the polymers made from them are expected to meet many performance requirements such as ease of application as a spray, by coating, in impregnation, or in mixing. For example, they should be stable prior to use, able to be used safely and sufficiently stable with good "pot life" during application so as to not cause processing difficulty. They may need to be able to release from a variety of materials and be easy to clean up. The conversion from pre-polymer resin to cured polymer should be able to be done under reasonable conditions of time, temperature, and pressure so as to maintain economically efficient industrial production. They may need to be able to cure in the presence of moisture as bound water or steam vapor. And the cost of the pre-polymer resins and processing them must be economically viable for commercial usage.

Among the aldehyde and isocyanate pre-polymer resins the phenol-formaldehyde (PF) and MDI pre-polymer resins and the respective polymers made from them satisfy many of these performance requirements. In spite of the many advantageous features of PF and MDI pre-polymer resins, their disadvantages have proven difficult to overcome, especially those of the relatively slow PF reactivity and the relatively expensive cost of MDI. Researchers have attempted to overcome these drawbacks with modifications to the basic PF or MDI pre-polymer resins, while others have combined them to draw upon the best attributes of each polymer.

Resorcinol-formaldehyde (RF) and Phenol-resorcinol-formaldehyde (PRF) resins are used to bond wood at ambient temperatures, while PF resin may be resorcinol modified, taking advantage of the high reactivity of the resorcinol. The cost of resorcinol, however, is much greater than phenol, and limits their usages to a few specialized applications.

Esters, organic carbonates, and lactones may act as accelerators for PF resins. U.S. Pat. No. 7,049,387 B2 discloses a method of accelerating the cure of a phenol-aldehyde resin with conjoint use of a cyclic carbonate and an amine. The cure rate can be further accelerated by the addition of a resorcinol source. Alkylene carbonates, polyalkylene amines and polyalkylene glycol amines are preferred, as is a formaldehyde deficient RF resin. In the example given, various accelerated resin mixes of a PF resin with an F:P molar ratio of 1.50 still requires in between 36 and 60 seconds in a stroke cure test run at 150° C. to cure.

Various efforts have combined PF resin and MDI in wood adhesives, some by separate component application, some by direct mixing and others by chemically blocking one of the components. U.S. Pat. No. 6,214,265 discloses a process for binding wood using an adhesive composition comprising a polymethylene polyphenylisocyanate and a solid PF resole. Composites are made by pressing at 350° F. for 4.5 minutes. In a related patent, U.S. Pat. No. 6,294,117 discloses a similar process except using a solid PF novolac instead of a solid resole. Wood composites are made by pressing at 350° F. for 4.5 minutes. Both patent disclosures are directed to formation of the composite within 2 to 10 minutes at temperatures of 120 to 225° C. U.S. Pat. No. 6,224,800 discloses the use of solid urea or melamine to extend polymethylene polyphenylisocyanate in wood composite binders. Particleboard panels are bonded at 350 or 400° F. for 4.5 minutes.

Others have attempted to implement ambient cure systems for wood composites. One such project is described in, "Rapid, Low-Temperature Electron, X-ray, and Gamma Beam-Curable Resins", which advocates development of rapid, low-temperature electron beam-curable resin systems for wood adhesives, estimating that such systems would offer a potential energy savings to the wood composites industry of 65 Trillion BTU's/year at full market penetration. The reduction of curing temperatures from 450° F. to 250° F. possible with beam-curing systems also offers the potential of reducing unit capital costs and doubling throughput. The lower curing temperatures would also decrease process emissions by reducing volatile organic compounds (VOCs). Another project, "Development of a novel adhesive for cold-press production of Laminated Veneer Lumber" attempts to develop novel moisture-curing polyurethane adhesives for the cold-press manufacture of laminated veneer lumber made from high moisture content wood with the project's focus being on combinations 100% organic, isocyanate-reactive polyurethanes combined with reactive latex crosslinked with polyisocyanate.

SUMMARY

Aspects of the present invention are exemplified in a number of illustrated implementations and applications, some of which are shown in the figures and characterized in the claims section that follows. For example, certain embodiments of the present invention related to the above discussion and are directed to addressing the long felt need for adhesive and coating systems that are more cost efficient than resorcinol or isocyanate systems alone.

In accordance with various aspects, the present invention is directed to a polymer-based system that combines the desirable attributes of PF and MDI in adhesive binders and coatings for the manufacture of cellulosic and lignocellulosic composites, and to PF-MDI hybrid polymers that are able to bond and cure such composites at ambient or slightly above ambient temperature, providing significant energy savings and reducing the introduction of hazardous VOC's to the environment.

In accordance with certain aspects of the present invention, it has been realized and discovered that the ambient temperature cure problem is efficiently and economically solved by forming a composition comprising a first part A comprising a polyurethane catalyst and an aldehyde resin pre-polymer and a second part B comprising a polyisocyanate pre-polymer and an aldehyde resin cure accelerator. The polyurethane catalyst is selected from the group consisting of Lewis bases, Lewis acids, insertion catalysts, metal catalysts, alkali metal salts of organic acids and phenols, and mixtures thereof. The aldehyde resin cure accelerator is selected from the group consisting of lactones, organic carbonates, carboxylic acid esters; ammonia reaction products of lactones, organic carbonates, carboxylic acid esters; and mixtures thereof.

In another aspect of the invention, the first part A and the second part B form a hybrid pre-polymer composition by microencapsulating the first part A in the second part B or alternatively by microencapsulating the second part B in the first part A to form the hybrid pre-polymer composition. In a further aspect, the invention comprises lignocellulosic composites made with the composition.

In another aspect, the invention provides a method for forming a composite with a two part hybrid polymer composition and a fibrous web material and a further aspect of applying a fluorinated isocyanate reactive compound to it.

The above summary is limited to characterizing certain aspects and is not intended to describe each illustrated embodiment or every implementation of the present invention. The figures and detailed description that follow, including that described in the appended claims, more particularly exemplify these embodiments.

BRIEF DESCRIPTION OF THE DRAWINGS

The invention may be more completely understood in consideration of the detailed description of various embodiments of the invention that follows in connection with the accompanying drawings as follows:

FIG. 2 illustrates the operative principle of a microbore dual liquid feed system using an ultrasonic atomizing head.

FIG. 3 illustrates the synergistic effect of a composition on gel time.

FIG. 4 illustrates the synergistic reduction in gel time of a composition over its components.

FIG. 5 shows that a composition is able to gel rapidly under ambient conditions.

Figure 1:
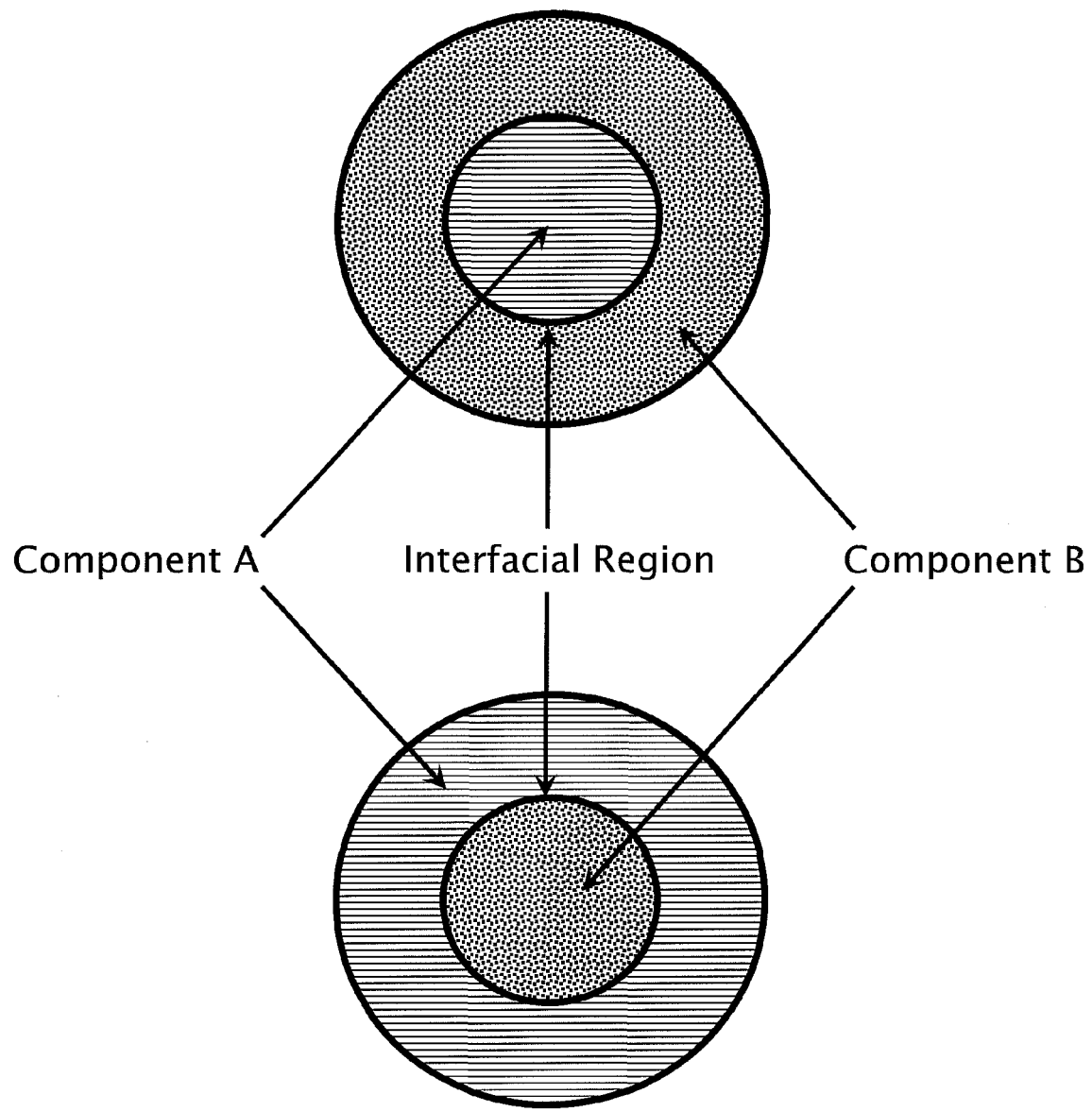
FIG. 1A illustrates microencapsulation of component A in component B.
FIG. 1B illustrates microencapsulation of component B in component A.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the claims.

DETAILED DESCRIPTION

The present invention is believed to be useful for certain implementations involving aldehyde prepolymer resins, polyisocyanate prepolymer resins, and hybrid polymers made from them that are useful for applications with adhesive binders, coatings, and composite materials. While the present invention is not necessarily limited to such applications, various aspects of the invention may be appreciated through a discussion of various examples using this context.

As a first example, certain embodiments of the present invention are directed to use of a hybrid polymer composition such as in veneers, overlays, low/high pressure laminates, finger jointed lumber, I joists, glue laminated lumber, and fibrous web materials. In such embodiments and as nonlimiting examples, a method for forming a hybrid polymer composition includes preparing a first part A comprising an aldehyde resin pre-polymer and a polyurethane catalyst, preparing a second part B comprising a polyisocyanate pre-polymer and an aldehyde resin cure accelerator, combining the first part A and the second part B to form a hybrid pre-polymer composition, and inducing reaction of said hybrid pre-polymer composition to form a hybrid polymer composition.

In connection with the present invention, it has been realized that by combining a rapid curing two part system wherein the first part comprises a polyurethane catalyst and a phenol-aldehyde pre-polymer and the second part further comprises a polyisocyanate pre-polymer and a phenol-aldehyde cure accelerator the ambient temperature cure problem is efficiently and economically solved and a hybrid phenolic-polyurethane polymer composition by is formed. Without being bound by theory, the phenol-aldehyde pre-polymer is thought to act as a polyol and react with the polyisocyanate pre-polymer to form polyurethane entities at temperatures ambient or above under the influence of the catalyst, while it also simultaneously self condenses at temperatures ambient or above under the influence of the accelerator to form methylene phenol linkages, thus forming a hybrid phenolic-polyurethane polymer. The skilled artisan would recognize that various useful properties of the hybrid phenolic-polyurethane polymer may be controlled by altering the molecular weight, molar ratios, relative proportions, and isocyanate percentages of the pre-polymers, polyurethane catalyst, accelerator, and other additives.

The phenol-aldehyde pre-polymer functions as a polyol, contributing hydroxyl functional groups for polyurethane formation and delivers the polyurethane catalyst to polyisocyanate pre-polymer in a stable form. The phenol-aldehyde pre-polymer also undergoes self condensation, normally a relatively slow reacting polymer requiring heat over time to polymerize, to form methylene phenol polymer linkages. This self condensation is uniquely accelerated, in comparison to other polyols, by certain esters, organic carbonates, and lactones which also advantageously function as effective, co-miscible diluents for polyisocyanate pre-polymers. The term "rapid cure" or "rapid cure time" as used herein refers to the time needed to achieve gelation is less than would be expected for a particular application by one skilled in the art. The term "ambient temperature" is to be understood as meaning the production environment temperature that would typically be present for a particular application as would be expected by one skilled in the art.

Suitable useful phenol-aldehyde pre-polymer resins usually exist as a mixture of hydroxy-alkylated hydroxy-aromatic compounds. It is to be understood that the term "phenol-aldehyde pre-polymer compound" may also refer to various natural and synthetic compounds possessing an aromatic ring, at least one hydroxy functional group attached to the aromatic ring and least two hydroxy-alkyl groups bound to the aromatic ring. Hydroxy-alkyl groups are linked to the hydroxy-aromatic compound in the ring positions ortho and para to the phenolic hydroxy group wherein the alkyl chain contains from 1 to 20 carbon atoms. Suitable compounds may include but are not limited to phenol, resorcinol, cresols, xylenols, tannins, lignins and various derivatives thereof. For certain embodiments discussed herein, as long as any phenol-aldehyde pre-polymer compound possesses at least one hydroxyl group capable of reacting with an isocyanate functional group to form a polyurethane and at least one hydroxy-alkyl group capable of having its self-condensation reaction rate increased by the accelerators, it may be used.

Phenolic pre-polymer resins, obtained by the condensation of a phenolic compound with an aldehyde, are generally categorized as "novolac" resins or "resole" resins. Novolac resins are prepared with a molar excess of phenol. Novolac resins are stable, permanently soluble, fusible resins in which the polymer chains have phenolic end-groups. They react to form crude to insoluble, infusible products upon the addition of a source of formaldehyde, such as hexamethylenetetramine or paraformaldehyde. Resole resins are generally prepared using an alkaline catalyst in aqueous solution with a molar excess of formaldehyde or other aldehydes and result in polymers having pendant methylol groups. Since each methylol group is effectively a potential cross-linking site, the resole resins are readily converted to the cross-linked, infusible polymers by heating. In comparison to novolac resins, resole resins are relatively unstable, having limited shelf life. In phenolic resole resins the phenolic nuclei are joined by methylene bridges located at the ortho- and para-positions relative to the phenolic hydroxyl group.

These phenol-aldehyde resole pre-polymer resins are typically prepared by the addition reaction of a suitable phenol group containing compound with an aldehyde, wherein a stoichiometric excess of the aldehyde group containing compound is present followed by a condensation polymerization reaction. Suitable phenolic components include nonyl phenol, as well as virtually any of the phenols which are not substituted at either the two ortho-positions or at one ortho and the para-positions. It is necessary that these positions be unsubstituted for the polymerization reaction with the aldehyde to occur. Any one, all, or none of the remaining carbon atoms of the phenol ring can be substituted. The nature of the substituent can vary widely, and the substituent preferably not interfere in the polymerization of the aldehyde with the phenol at the ortho- and/or para-positions, substituted phenols employed in the formation of the phenol-aldehyde pre-polymer resins include, for example, alkyl-substituted phenols, aryl-substituted phenols, cyclo-alkyl-substituted phenols, alkenyl-substituted phenols, alkoxy-substituted phenols, aryloxy-substituted phenols, and halogen-substituted phenols, the foregoing substituents containing from 1 to 26 and preferably from 1 to 12 carbon atoms. Specific examples of suitable phenols include, for example, phenol, 2,6-xylenol, o-cresol, m-cresol, p-cresol, 3,5-xylenol, 3,4-xylenol, 2,3,4-trimethyl phenol, 3-ethyl phenol, 2,5-diethyl phenol, p-butyl phenol, 3,5-dibutyl phenol, p-amyl phenol, p-cyclohexyl phenol, p-octyl phenol 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. Also, other suitable phenolic compounds are those compounds containing a second phenolic hydroxyl group such as, for example, catechol, resorcinol and hydroquinone. Still other suitable phenolic compounds may include naturally occurring phenolic compounds such as lignin, tannins, flavonoids, and methylol derivatives thereof. Phenol is a preferred phenolic compound.

The aldehydes reacted with the phenol can include any of the aldehydes theretofore employed in the formation of phenolic resins such as, for example, formaldehyde, acetaldehyde, propionaldehyde, glyoxal, glutaraldehyde, furfuraldehyde, and benzaldehyde. In general, the aldehydes employed have the formula: R'CHO wherein R' is a hydrogen or hydrocarbon radical of 1 to 8 carbon atoms. Formaldehyde is a preferred aldehyde.

The phenol-aldehyde resole pre-polymer resins are typically prepared by reacting a stoichiometric excess of the aldehyde with a suitable phenol group containing compound in aqueous alkaline solution, thereby forming a resole resin solution in water. A portion of the water can be subsequently removed by evaporation or distillation for replacement with a solvent such as an aliphatic alcohol, a diol, a triol, or mixtures thereof. Examples of suitable aliphatic alcohols include but are not limited to methanol, ethanol, 1-propanol, 2-propanol, 1-butanol, 2-butanol. Examples of suitable diols include but are not limited to ethylene glycol, 1,2-propylene glycol, 1,3-propylene glycol, 1,4-butane diol, diethylene glycol, and polyethylene glycol of various molecular weights. Examples of suitable triols include but are not limited to glycerol and 1,2,6-hexane triol.

By replacing water distilled off of a phenol-aldehyde pre-polymer with an appropriate diol or triol solvent, or mixture thereof, a multi-component polyol composition can be formed in which each component is capable of reacting with the polyisocyanate pre-polymer to form the hybrid phenolic-polyurethane polymer. In addition, by virtue of being essentially water free, such a composition could avoid or at least minimize the undesirable production of carbon dioxide associated with the reaction of water and the isocyanate functional group. Typically, such compositions would be too expensive to consider for conventional PF applications, since the solvent diols and triols would be not contribute to the active polymer. The diols and triols however, could readily incorporate into the hybrid phenolic-polyurethane polymer. Such a composition would also help avoid some of the problems associated with processing of typical alcohol solvents such as methanol, ethanol, or isopropanol, for example, the added capital cost of drying equipment, VOC elimination, and addressing operational safety considerations like explosion proofing the manufacturing environment.

The only limitation on the molecular weight of the phenol-aldehyde pre-polymer is that it be physically in a form where it can be combined with the polyisocyanate pre-polymer such that the two components come in intimate molecular contact. An aldehyde to phenol molar ratio above 1.0 is preferred while the upper limit of aldehyde to phenol molar ratio is only limited by health, safety, or environmental concerns for levels of free aldehyde. For many applications, the pH of the phenol-aldehyde pre-polymer resin is preferably greater than 7, more preferably between 8 and 13 and even more preferably between 9.5 and 12.

The phenol-aldehyde pre-polymer resin may be used alone or in combination with other polyols to react with the polyisocyanate pre-polymer to form a hybrid phenolic-polyurethane polymer. More broadly, the phenol-aldehyde pre-polymer resin may be used alone or in combination with other active hydrogen compounds to react with the polyisocyanate pre-polymer to form a hybrid phenolic-polyurethane polymer.

The polyol functions as a monomeric component with the polyisocyanate pre-polymer to form a polyurethane polymer. The polyol may be an aliphatic, aromatic, or even amino based pre-polymer. What can be important is that it possesses at least two active-hydrogen hydroxyl groups in order to function as a polymeric repeat unit capable of reacting with the polyisocyanate pre-polymer to form the polyurethane polymer. In the present invention, it must also be capable of forming a stable mixture with the polyurethane catalyst. Reactive modifiers such as diols and higher polyols, e.g., diols, triols, glycols, sugars, polyethylene glycols, polysaccharides, polyvinyl alcohols, and/or polyhydric phenols, such as resorcinol, phloroglucinol, tannins, lignins, resorcinol-formaldehyde, phenol-resorcinol-formaldehyde, or polyhydric amino resins such as melamine-formaldehyde, urea-formaldehyde, melamine-urea-formaldehyde and the like, can be added to the phenol-aldehyde pre-polymer resin during or after formulation.

The active hydrogen-containing compounds that are capable of reacting with isocyanates in accordance with certain methods of the invention are by no means limited to compounds containing hydroxyl groups, but generically include all compounds which give a positive test for reactive hydrogen as determined by the Zerewitinoff method. Typical of the active hydrogen containing compounds that can react with isocyanates are compounds containing an oxygen-hydrogen bond, such as water, hydrogen peroxide, alcohols, hydroperoxides, phenols, boronic acids, carboxylic acids, percarboxylic acids and sulfonic acids; compounds containing a nitrogen-hydrogen bond, such as ammonia, amines, amides, lactams, ureas, urethanes, allophanates, biurets, acyl ureas, thioureas, hydrazines, oximes, amidines, hydroxylamines, hydrazones, hydroxamic acids, nitramines, diazoamino compounds, and sulfonamides; compounds containing sulfur-hydrogen bond, such as mercaptans, thiophenols and thioacids; halogen acids; compounds containing active methylene groups and compounds capable of forming enols such as acetone, malonic esters, acetoacetic esters, acetyl acetone and nitromethane; and miscellaneous active hydrogen-containing compounds, such as acetylinic compounds and dialkylphosphonates. Also included among the applicable active hydrogen-containing compounds are compounds containing two or more of any one or combination of active hydrogen compounds already described. Examples include ethylene glycol, diethylene glycol, hexamethylene glycol, glycerol, 1,2,6-hexane triol, sorbitol, dextrin, starch, cellulose, polyvinyl alcohol, ethylene-vinyl alcohol copolymers, cellulose acetate, shellac, castor oil, polyethylene glycols, polyesters, alkyd resins, polyvinyl acetals, polyvinyl ketals, polyethers, polyether esters, polyacrylic acids, ethylene diamine, hexamethylene diamine, ethanolamines, polyester amides, poly(hexamethylene adipamide), wool, and proteins. Materials such as glass and metal which have thin surface films of moisture at the time of reaction with an isocyanate are also included.

For certain embodiments of the invention that active hydrogen-containing compounds capable of reacting with isocyanates as determined by the Zerewitinoff method may also contain fluoroalkyl groups. Active-hydrogen fluoro compounds provide the desirable properties associated with fluorocarbons in a compound that can be covalently bonded with an isocyanate group on the surface of the polyisocyanate pre-polymer component. Examples of desirable properties imparted include chemical inertness, thermo-oxidative stability, lower surface energy, higher contact angle, reduced coefficient of friction, and oleo-hydrophobicity.

The preferred compound for producing a low energy surface film or coating for concrete formwork contains at least one active hydrogen functional group and at least one perfluoroalkyl chain. Without wishing to be bound by theory, the active hydrogen functional group is thought to bond covalently to the isocyanate group of the polyisocyanate pre-polymer with the attached perfluoroalkyl group remaining pendant on the polyurethane polymer surface, providing the polyurethane polymer very low surface energy with good adhesive properties when it comes in contact with poured concrete.

Typical active-hydrogen fluorinated compounds used to form the isocyanate functional adducts are a fluoroalkyl containing group having at least 2 carbon atoms and preferably a straight chain or branched chain fluoroalkyl group having 2-20 carbon atoms which optionally can contain oxygen atoms as ether groups or can contain 1-5 chlorine atoms or 1-5 hydrogen atoms. Preferably, the fluorinated compound is a perfluoroalkyl group having 2-20 carbon atoms and preferably it is a perfluoroalkyl group containing 6-12 carbon atoms. The fluorinated compound must also possess an active hydrogen functional group as determined by the Zerewitinoff method capable of reacting with an isocyanate functional group. Monohydric fluorinated alcohols are preferred compounds, preferably they may have from 1 to 30 carbon atoms, desirably from 3 to 20, and may be branched, linear, or cyclic. Examples of suitable monohydric fluorinated alcohols are commercially available from DuPont (Zonyl BA-L or Zonyl BA) or Solvay Solexis (D, D 10-H, D10, E, E-10).

A fluorinated polyurethane may be prepared by first impregnating or coating the isocyanate on a fibrous medium or a substrate, then applying the fluorinated active hydrogen compound on it, optionally mixed with solvents and a catalyst and heating it to a temperature between about 50-160° C., preferably 60-85° C. for at least 30 seconds to 240 minutes. By fluorinating the surface polyisocyanate pre-polymer on a phenol-aldehyde pre-polymer, a fluorinated phenolic-polyurethane prepolymer may be formed.

Examples of suitable active-hydrogen perfluorinated alcohols include but are not limited to trifluoroethanol, trifluoropropanol, pentafluoropropanol, hexafluoroisopropanol, hexafluorobutanol, 1H,1H-perfluoro-1-heptanol, 1H,1H-pentadecafluoro-1-octanol, 1H,1H-perfluoro-1-nonanol, 1H,1H-perfluoro-1-decanol, 1H,1H,11H-eicosafluoro-1-undecanol, 1H,1H-perfluoroundecan-1-ol, 1H,1H-perfluoro-1-dodecanol, 1H,1H-perfluoro-1-tetradecanol, 1H,1H-perfluoro-1-hexadecanol, 1H,1H-perfluoro-1-octadecanol, 2,2,3,3-tetrafluoro-1,4-butanediol, 2,2,3,3,4,4-hexafluoro-1,5-pentanediol, 2,2,3,3,4,4,5,5-octafluorohexane-1,6-diol, 2,2,3,3,4,4,5,5-octafluoro-1,6-hexanediol, 2,2,3,3,4,4,5,5,6,6,7,7-dodecafluoro-1,8-octanediol, 1H,1H,10H,10H-perfluorodecane-1,10-diol, 1H,1H,12H-1,12H-perfluoro-1,12-dodecanediol, perfluoro-tert-butanol, fluorinated triethylene glycol monomethyl ether, fluorinated diethyleneglycol monobutyl ether, fluorinated triethylene glycol monobutyl ether, fluorinated triethylene glycol.

Examples of suitable active-hydrogen perfluoroamine compound include but are not limited to 2,2,2-Trifluoroethylamine, 2,2,3,3,3-Pentafluoropropylamine, 2,2,3,3,4,4,4-Heptafluorobutylamine, 1,1,1,3,3,3-Hexafluoroisopropylamine, 2,2-Difluoroethylamine, 1H,1H-Perfluorooctylamine, 3,3,3-Trifluoropropylamine, Bis(2,2,2-trifluoroethyl)amine, Perfluorotributylamine, Perfluorotriethylamine, Perfluorotripentylamine, Bis(2,2,3,3-pentafluoropropyl)amine, Bis(1H,1H-heptafluorobutyl)amine, and 4,4,4-Trifluorobutylamine.

The polyurethane catalyst acts to increase the rate of reaction between the phenol-aldehyde pre-polymer and the polyisocyanate pre-polymer in formation of a hybrid phenolic-polyurethane polymer. As an integral component of the phenol-aldehyde pre-polymer composition, it remains available for catalytic activity and yet does not compromise the stability of the phenol-aldehyde pre-polymer. Known catalysts for accelerating the isocyanate-hydroxyl addition reaction may in principle be used in forming these compositions.

Organic metal compounds, especially organic tin compounds, can also be employed as catalysts. Suitable organic tin compounds are tin-(II) salts of carboxylic acids, such as tin-(II) acetate, tin-(II) octoate, tin-(II) ethylhexoate and tin-(II) laurate, and the dialkyl-tin salts of carboxylic acids, such as, for example, dibutyl-tin diacetate, dibutyl-tin dilaurate, dibutyl-tin maleate or dioctyl-tin diacetate.

Lewis acid salts containing multi-valent metals are suitable catalysts, especially salts of tin, mercury, and lead. Stannous chloride and stannous fluoride are preferred. Further suitable catalysts are nitrogen-containing bases such as ammonium hydroxide or tetraalkylammonium hydroxides, alkali metal hydroxides such as sodium hydroxide, alkali metal phenolates such as sodium phenolate, or alkali metal alcoholates such as sodium methylate. Hexahydrotriazines may also be employed as catalysts. The combination of lithium, sodium, or potassium phenolates with stannous chloride or stannous fluoride is more preferred with sodium phenolate and stannous chloride being preferred among them. Without wanting to be bound by theory, the $Sn^{2+}$ ion is thought to complex with the phenolate, or methylol phenolates with the phenol-aldehyde pre-polymer resin, creating a synergistic catalyst complex with greater effect than either component alone. The methylol phenolate-$Sn^{2+}$ complex or combination is preferred.

Other suitable catalysts include, for example, tertiary amines, such as triethylamine, tributylamine, triethylene diamine, dimethylethyl amine, pyridine, 4-phenylpropyl pyridine, bis(N,N-dimethylaminoethyl) ether, N,N'-dimethylaminoethyl-N-methyl ethanolamine, N-methyl-morpholine, N-ethyl-morpholine, N,N-dimethylaminoethyl morpholine, quinoline, morpholine, N-methyl morpholine, N,N,N'-tetramethyl-ethylenediamine, 1,4-diaza-bicyclo-(2,2,2)-octane, N-methyl-N'-dimethylaminoethylpiperazine, N,N-dimethylbenzylamine, bis-(N,N-diethylaminoethyl)adipate, N,N-diethylbenzylamine, pentamethyldiethylenetriamine, N,N-dimethylcyclohexylamine, N,N,N',N'-tetramethyl-1,3-butanediamine, N,N-dimethyl-β-phenylethylamine, 1,2-dimethylimidazole, 2-methylimidazole, and also hexahydrotriazine derivatives.

Tertiary amines which contain active-hydrogen towards isocyanate groups are, for example, triethanolamine, triisopropanolamine, N-methyl-diethanolamine, N-ethyldiethanolamine, N,N-dimethyl-ethanolamine and their reaction products with alkylene oxides, such as propylene oxide and/or ethylene oxide. Examples of other suitable catalysts are 2,4,6-tris(dimethylaminomethyl)-phenol, methyldiethanolamine, N-methyldipropyldiamine, dibutylaminoethanol, dimethylamino-2-propanol, diethylaminoethoxyethanol and o-tolylpropanolamine. Further suitable catalysts include 1,4-diaza(2,2,2)bicyclooctane, N,N'-bis-dimethyldiethyl-piperazine, hexamethyltriethylenetetramine, dimethylbenzylamine, dimethylcetylamine, 1,8-diazabicyclo[5,4,0]undec-7-ene and tetramethyl-1,3-butanediamine.

Further examples of catalysts which can be used, and details of the mode of action of the catalysts, are described in "Kunstoff Handbuch" (Plastics Handbook), Volume VII, published by Becker and Braun, Carl Hanser Verlag, Munich, 1983 on pages 92-98. The catalysts are used in a quantity of about 0.001 to 10% by weight, preferably about 0.002 to 0.1% by weight based on the amount of the polyisocyanate pre-polymer.

The polyisocyanate pre-polymer provides one component of the hybrid polymer backbone and possesses the inherent advantageous properties of the isocyanate functional group: rapid reactivity under catalysis to form urethane groups, the ability to be applied as a 100% neat organic liquid, and co-miscibility with a diluent capable of accelerating the condensation reaction of a phenol-aldehyde pre-polymer.

The term polyisocyanate pre-polymer or polyfunctional isocyanate is defined as those isocyanate compositions that have at least two isocyanate (N=C=O) groups available. For certain embodiments, suitable polyisocyanate pre-polymer resins may comprise aromatic isocyanates like toluene diisocyanate (TDI) or diphenyl methane diisocyanate (MDI), while aliphatic isocyanates may comprise hexamethylene diisocyanate (HDI), isophorone diisocyanate (IPDI), or hydrogenated MDI ($H_{12}$-MDI), or combinations of any of them. MDI is a preferred isocyanate form and with at least two isocyanate functional groups. As one preferred group of compounds diphenyl methane diisocyanate and its oligomers are utilized. The term "polyisocyanate" should be construed to include those compounds having two or more available (N=C=O) functional groups.

Blocked polyisocyanate pre-polymer may also be used; i.e., having attached heat labile substituent groups that inhibit reaction below some specified temperature, or conversely release and react above that temperature. Suitable blocking agents for isocyanates include ketoximes, and imidazoles, phenols, lactams, and the like. Another group of blocking agents is various cyclic ureas having from 3 to 12 carbon atoms such as trimethylene or tetramethylene urea. The ketoximes generally have about 3 to about 20 carbon atoms and desirably from about 3 to about 15 carbon atoms and include dimethyl-methylethyl-,diisopropyl-, or dicyclohexy-lketoxime; benzophenone. The triazoles and imidazoles generally have a total of from 2 to 10 carbon atoms and include benzotriazole, tolytriazole, phenylimidazole, and the like. The phenols having 6 to 20 carbon atoms constitute another class of suitable blocking agents and specific examples of such are well known to the art and to the literature including phenol, nonylphenol, and the like. The lactams generally contain a total of from about 3 or 4 to 12 carbon atoms and are also well known to the art and to the literature with specific examples including epsilon-caprolactam, lauryl lactam, and the like. Other classes of deblocking agents include the various amines. The amount of blocking agent should be sufficient to create an equivalent ratio of blocking agent/(N=C=O) greater than 1, and preferably not above 1.2.

The function of the accelerator is to accelerate the self condensation polymerization reaction of the phenol-aldehyde pre-polymer component and also that of diluting the polyisocyanate prepolymer in order to assure easier mixing or impregnation due to the lower mix viscosity.

The accelerator for the phenol-formaldehyde resin has an ester functional group and may be selected from the group consisting of lactones, organic carbonates, carboxylic acid esters; ammonia reaction products of lactones, organic carbonates, carboxylic acid esters; and mixtures thereof.

Examples of suitable lactones include, but are not limited to, gamma-butyrolactone, beta-propiolactone, beta-butyrolactone, beta-isobutyrolactone, beta-isopentylactone, gamma-isopentylactone and delta-pentylactone. Examples of suitable organic carbonates include, but are not limited to, propylene carbonate, ethylene glycol carbonate, glycerol carbonate, 1,2-butanediol carbonate, 1,3-butanediol carbonate, 1,2-pentanediol carbonate and 1,3-pentanediol carbonate. If an organic carbonate is utilized, it is preferred to use propylene carbonate. Suitable carboxylic acid esters include, but are not limited to, methyl formate, methyl acetate, ethyl acetate, N-butyl acetate, butylene glycol diacetate, ethylene glycol diacetate and triacetin (glycerol triacetate). Other aliphatic monoesters could be used, such as $C_1$-$C_4$ alkyl propionate, $C_1$-$C_4$ alkyl formate, $C_1$-$C_4$ alkyl acetate, $C_1$-$C_4$ alkyl butyrate, or $C_1$-$C_4$ alkyl pentanate. Additional aliphatic multiesters which could be used include ethylene glycol di-$C_1$-$C_5$ alkyl ester, diethylene glycol di-$C_1$-$C_4$ alkyl ester, propylene glycol di-$C_1$-$C_4$ alkyl ester, butylene glycol di-$C_1$-$C_4$ alkyl ester, glycerol $C_1$-$C_4$ alkyl ester, 1,3-propanediol $C_1$-$C_3$ alkyl ester, 1,3butanediol $C_1$-$C_2$ alkyl ester and 1,4-butanediol $C_1$-$C_2$ alkyl ester. Also, carboxylic acid esters from carbohydrate-based polyols and esters of dibasic carboxylic acids such as dimethyl oxalate and hydrolyzable polyesters could be used. Generally, it is preferred to use an accelerator which contains 6 or 7 carbon atoms and that it should be co-miscible with the polyisocyanate pre-polymer in order to form a polyisocyanate pre-polymer composition and said composition should then be dispersible in the phenol-aldehyde pre-polymer resin and capable of remaining in suspension long enough to co-react with the phenol-aldehyde pre-polymer and effect the curing of the hybrid phenolic-polyurethane polymer. At least 1% by weight of phenol-aldehyde pre-polymer resin solids of the accelerator is utilized. More preferably for certain applications, the amount of accelerator is 1% by weight to about 20% by weight of phenol-aldehyde pre-polymer resin solids, with about 3% by weight to about 7% by weight being preferred.

Additionally, if desired, additives can be compounded into either of the pre-polymers or pre-polymer components prior to usage as an adhesive binder, coating, or material. Additives known or that might be developed may be used. Additives may include those that enhance, confer, alter or modify an end property desirable in the adhesive binder, coating, material, or the composite object and/or that aids in the processing or atomization of the adhesive. Types of additives that improve functional performance include plasticizers, viscosity modifiers, surface tension modifiers, release agents, flame retardants, biocides, dyes, pigments, fillers, extenders, reinforcements, coupling agents, hygroscopic agents, hydrophobic agents, formaldehyde scavengers, and/or colorants. In those embodiments of the invention wherein either pre-polymer component is subjected to an ultrasonic field, those physical and or chemical properties of the pre-polymer that permit formation of a microencapsulated composition via ultrasonic atomization should not be substantially altered in any way that would limit the microencapsulation process.

The optional additives which may be included in the compositions of the present invention include, sodium chloride, sodium sulfate, paraffin, fatty acids or their salts such as zinc stearate and other similar materials Such materials may be added as agents that reduce swelling and water absorption. At the same time, paraffin and fatty acids and their salts may serve as release agents.

During the process of preparing the pre-polymer resins and components of the present invention, a variety of other modifiers can be added, usually in small quantities, into the pre-polymer resins or the components in order to improve toughness and other physical or mechanical properties of the cured hybrid phenolic-polyurethane polymer. These modifiers may include, for example, chain terminating phenols, glycols, halogenated compounds, polyphosphate esters, polyester polyols, alkyl phenols, hydroxy-containing acrylates, latexes, polyamides, polyvinyl alcohols, polyvinyl acetates, and the like and mixtures thereof.

Almost any fibrous material substrate is a suitable raw material for one embodiment of the invention. Suitable fibrous material substrates that may be coated, bonded, or impregnated include organic fibers such as cellulose, synthetic polymers, or carbon fiber, inorganic fibers such as metal, ceramic, or glass, and combinations thereof. Fibers of any dimensions may be used including nano-dimensioned fibers. The fibrous material may be woven or non-woven and is preferably in sheeted or rolled web form. Examples of cellulosic fibrous material are natural saturating Kraft, recycled saturating Kraft, bleached or unbleached Kraft linerboard, paper products, chemical or thermomechanical pulp, sheets, or mats, and the like. The fibrous material must sufficiently porous to take up a quantity of the phenol-aldehyde or polyisocyanate pre-polymer components, if it is to be used for impregnation. Obviously, porous fibrous materials may be used for coating and bonding. Dense, non-porous materials are also useful, but only for coating and bonding. Cellulosic fibrous material is preferred, with Kraft linerboard being more preferred.

Either the phenol-aldehyde or polyisocyanate pre-polymer component may be impregnated into the cellulosic fibrous material as is or with added viscosity reducing solvents such as water, methanol, ethanol, isopropyl alcohol, ethylene glycol, propylene glycol, diethylene glycol and the like for the phenol-aldehyde pre-polymer component and acetone, ethylene carbonate, propylene carbonate, methyl formate, ethyl acetate, triacetin, γ-butyrolactone, and the like for the polyisocyanate pre-polymer component. The desired weight addition of the phenol-aldehyde or polyisocyanate pre-polymer components to the cellulosic material is in a range of from about 5-300% based on the oven dried weight of the cellulosic material depending upon the desired end properties in the cured material. In manufacturing useful impregnated products that are relatively rigid, strong and water repellant, a desirable weight range for the combination of the phenol-aldehyde or polyisocyanate pre-polymer components is from about 10-150% based on the oven dried weight of the cellulosic material where excellent end use properties are obtained at a reasonable manufacturing cost. For many applications, the phenol-aldehyde and polyisocyanate pre-polymer components may be used in any proportions based on active polymer solids by weight, so long as both components are used, with ratios 95:5 to 5:95 being preferred, ration of 80:20 to 20:80 being more preferred, and ratios of 70:30 to 30:70 being even more preferred based on active polymer solids by weight.

Impregnating the cellulosic material can be done by simply passing the cellulosic fibrous material through an application device to achieve the desired resin content of either the phenol-aldehyde or the polyisocyanate pre-polymer component. The order of impregnation of the pre-polymer components is not critical. If desired, either pre-polymer component may be preheated to reduce its viscosity and facilitate more rapid penetration of the fibrous substrate. Suitable application devices include saturation baths with metering rolls, roll coaters, gravure rolls, Meyer bars, slot die extrusion coaters, spray equipment and the like. Any solvents, if used at all, may be removed through drying with conventional forced air oven, infrared radiation, radio frequency radiation, or the like. A relatively low resin content of the first pre-polymer component applied in the range of 5 to 25% of the oven dry fibrous material weight is preferred in order to achieve a light or even molecular coating of the fibrous substrate material while maintaining some porosity in the fibrous sheet or web prior to introduction of the other pre-polymer component. The other pre-polymer component is then applied with an appropriate application device and brought into intimate contact with the first pre-polymer component, initiating the rapid reaction of the two components and producing a fibrous-phenolic-polyurethane polymer matrix composite. The final combined resin content may be from 10 to 300% of the oven dry fibrous material weight, with 10 to 100% being more preferred, and 20 to 50% being even more preferred for certain applications. If desired, although not necessary since it can cure at ambient temperature, the combination of the fibrous materials and both pre-polymers may be heated to accelerate the cure of the hybrid polymer. In principle, a mixture of the phenol-aldehyde and polyisocyanate pre-polymer components may be impregnated into a fibrous substrate, though in practice such impregnation may be difficult due to a rapid increase in viscosity of the mixture.

The impregnated fibrous substrate may then be further coated, if desired, with other materials known in the art, such as primer coatings, glue line coatings, and the like to provide additional performance features. In one embodiment of the present invention the fibrous substrate is first impregnated with the phenol-aldehyde pre-polymer component and then it is coated with the polyisocyanate pre-polymer component. Before the combination is allowed to cure completely and while free isocyanate functional groups are available for reaction at the material surface, a composition comprising an active-hydrogen fluorinated compound and a small amount of a polyurethane catalyst is applied to the surface with any suitable method facilitating covalent bond formation and creation of fluorinated polyurethane adducts at the surface of the material. The fluorinated surface is very useful for chemical durability and adhesive usage, especially as a concrete form surface film that does not require the application of form oil. Such a material would create significant environmental and economic benefit in that it would not use or release costly form releases that are currently used into the environment. The fluorinated material could be applied at a low percentage in the range of 0.1 to 10 percent loading by weight based on the weight of the polyisocyanate pre-polymer and still provide excellent surface properties.

While a single sheet of cellulosic material impregnated with the hybrid phenolic-polyurethane polymer composition can be hot pressed to convert and cure the pre-polymers to a polymer, multiple sheets of the impregnated material can be laminated to each other as long as the combined pre-polymers remain in a uncured state to produce a substrate useful as a base layer for a high pressure laminate. Cured or uncured sheets may be laminated to the surface of compatible materials such as wood veneer or reconstituted wood composites, for example, plywood, OSB, MDF, particleboard, hardboard, and the like. Use of the hybrid phenolic-polyurethane polymer provides a significant cost advantage over isocyanate only composites due to the use of the lower cost phenol-aldehyde pre-polymer and the rapid cure time.

Principles underlying the composition may be used to prepare adhesive binders useful for bonding wood composites composed of veneer, for example, plywood and laminated veneer lumber (LVL). The use of hybrid phenolic-polyurethane adhesive binders according to the invention would permit advantageous use of higher moisture veneer with its attending benefits of lower energy consumption and reduced VOC emissions during drying. Such adhesive binders would also permit the use of substantially lower press temperatures and or reduced press cycles, resulting in significant energy savings, higher productivity, reduced press VOC emissions, higher wood fiber yield due to less compression loss, and improved dimensional stability of the product. The use of such an adhesive binder would be especially beneficial with greater panel thicknesses for requiring less heat to cure the inner glue lines.

Adhesive binders representing an embodiment of the present invention would also be suitable for solid wood gluing of I-joists, finger joints, and glue laminated lumber which have traditionally used the more expensive resorcinol-formaldehyde or phenol-resorcinol-formaldehyde and more recently melamine-formaldehyde or urea-formaldehyde adhesives. Use of phenol-aldehyde pre-polymer would be less expensive than resorcinol based adhesives and with a combination of the polyisocyanate pre-polymer and an Sn(II) based polyurethane catalyst, preferably $Sn(II)Cl_2$ a well known reducing agent, a desirable light color glue line can be produced. Also methods and compositions of embodiments of the present invention could find utility in the production of various foams, insulation materials and coatings.

Embodiments of the present invention may be used to prepare wood composites from particulate furnish material. Other components may be added to the material particles, either before, after and/or during the application of the adhesive. For example, one may wish to add a neat wax or a wax emulsion to the material particles. The neat wax or wax emulsion may be added in powder or liquid form and dispersed throughout the particles by any means including mixing and rotation. If introduced in a liquid form, such additional components may be applied in droplet form, for example by conventional techniques.

Subsequent to the application of the adhesive and/or any other desired additional components, the adhesive/material particles mixture is formed into a composite object. Generally, composite objects are formed by application of heat and/or pressure, but in the case of particular embodiments of the present invention, heat may be optional. Adhesive-coated wood particles may be formed into panels. For example, panels can be produced by laying up the wood particles into a random mat in fixed frame deckle box on a metal caul plate, and compressing the mat using a manually controlled, electronic-heated hot press.

If oriented strand board is being prepared, the coated wood particles may be formed into mats. The wood particles are oriented either by an electrical field, or more commonly, aligned mechanically either manually or by vibrating the particles through fins. The arrangement of the alignment depends on the type of oriented strand board to be prepared. For example, the wood particles may be aligned at the top and bottom layers running the length of the panel and the core particles running across the panel. During this process, a mat of strands is built up, with each layer being laid down separately along the conveyor belt, the final mat with several plies is continuous, and is between 100 and 200 millimeters high. At this point, as is known to those skilled in the art, the resin is not yet cured.

In the press, the mats are typically heated to approximately 185 to 205° C. and are compressed to a specified thickness, discussed above. With the use of adhesive binders of embodiments of the present invention, however, press temperatures are possible anywhere from ambient to about 205° C., with lower temperatures preferred to avoid pre-cure of the pre-polymer resin. The heat and pressure produced by the press cause the resin coating the wood particles to cure. The pressure also causes a tangling of the fibers of the wood particles, increasing the strength of the resultant panels. The panels are allowed to cool until the curing process is complete and equilibrium moisture content is reached. Another advantage is that panel may be produced much closer to equilibrium moisture content, requiring less conditioning and possessing better dimensional stability.

The skilled practitioner of the art will readily see the advantages of embodiments of the invention and be able to employ various techniques well known in the art in order to take advantage of the extraordinary reactivity for forming adhesives, coatings, impregnates, and other polymeric materials. Such techniques may include, but are not limited to honeymoon application of the two components for materials such as finger joints, separate application in the form of strings, dots, strands, etc. for materials such as parquet flooring, and glue laminated lumber. In addition standard polyurethane mixing systems may be used for applications such as I-joists, furniture-joints, cold-pressed plywood, and laminated veneer lumber. The skilled practitioner in the art will readily see the advantage of selecting the pre-polymer properties such as molecular weight, molar ratios, percent functional groups present, functionality, and the type and amount of polyurethane catalyst and accelerator in order to achieve useful polymer properties and working cure speeds for a wide variety of applications. Advantages and applications in the field of nanotechnology would be readily apparent using techniques such as vapor condensation, vacuum evaporation on running liquids, or electro-spinning to prepare nanofibers, core shell fibers, hollow fibers, and tubes with nanoscale diameters using nanopolymers comprising the inventive composition. Use of embodiments of the invention in two parts and a suitable solvent with the electro-spinning technique would permit rapid manufacture of phenolic-polyurethane hybrid polymer nanofibers at low temperatures.

In one embodiment of the invention, the combination of the first part A and the second part B to form a hybrid pre-polymer composition is performed by microencapsulating the first part A in the second part B or alternatively by microencapsulating the second part B in the first part A to form a hybrid pre-polymer micro-encapsulated droplet composition as shown in FIGS. 1A and 1B. This microencapsulation is preferably accomplished using an ultrasonic system for creating microencapsulated droplets from the combination of two liquids as shown in FIG. 2, although other microencapsulation techniques known to those skilled in the art such as spray drying, coacervation, interfacial polymerization immersion or centrifuge, multi-fluid nozzles, fluidized bed, electrostatic, or vacuum methods may be used if they are able to produce the encapsulated system in a similar configuration or if they can encapsulate the catalyst-accelerator combination by techniques known in the art, in a manner useful for effecting rapid cure of combined phenolic and polyisocyanate prepolymer resins. A preferred method for forming the microencapsulated hybrid pre-polymer composition uses the first part A and the second part B to be liquids with viscosities less than 50 cP in order to use the ultrasonic microencapsulation method. The method for forming the combined microencapsulated hybrid pre-polymer composition of the first part A and the second part B forms droplets with diameters of about 0.2 to 200 microns. It is readily apparent that microencapsulation of two component adhesives could be useful for a variety of highly reactive systems. Examples include but are not limited to amino-formaldehyde resins and acid based hardeners, resorcinol-formaldehyde resins and their hardeners, epoxy resins, etc.

A particular embodiment includes supplying the two pre-polymer adhesive components to dual flow lines that feed an ultrasonic field to form droplets of two micro-encapsulated pre-polymer resin components. Without wishing to be bound by theory, the interfacial layer between the two components is thought to form a polyurethane membrane or skin within the droplet, providing the droplet mechanical and chemical stability until it is further processed. The microencapsulated hybrid resin droplets are then applied to a plurality of wood particles. The wood particles and resin droplet combination are subsequently formed into a wood composite material under pressure and optionally heat. The pressure then mechanically ruptures the interfacial membrane or skin, causing the two components to mix in situ and react to form the hybrid phenolic-polyurethane polymer adhesive. Embodiments of the invention also provide for wood composite materials prepared by this method and improved wood composite materials containing resin droplets that have been ultrasonically atomized into micro-encapsulated two component particles.

The viscosity of the pre-polymer components used can vary depending on various fundamental parameters, including the capabilities or limitations of the ultrasonic device employed. Dual flow feed ultrasonic atomization systems currently permit a maximum viscosity of 50 centipoise, though technical advances may permit usage of higher viscosity liquids in the future. Viscosity modification of the pre-polymer components to function effectively within the technical limits of the dual feed ultrasonic system can be performed, for example, by increasing the temperature and/or the addition of rheology modifiers. The viscosity of the pre-polymer components is that at the temperature of the dual flow stream and is preferably less than about 50 centipoise. A viscosity of about 1 to 30 centipoise being more preferred. The liquid temperature is not critical in and of itself, so long as it is sufficiently low to be able to be processed for ultrasonic micro-encapsulation and does not cause premature reaction of the two components. These viscosity limits for the practice of ultrasonic micro-encapsulation of the two pre-polymer components should not in any way be construed as imposing a limitation on the usable viscosity of the pre-polymer components in the other broader embodiments of the general invention.

The amount of applied adhesive relative to the amount of particles and/or other components will vary depending on several factors, including the type and nature of material used, type of adhesive(s) used, environmental conditions in the forming facility and/or the properties desired in the end product. However, in those embodiments wherein wood particles are combined with an adhesive(s), it is preferred that the wood particles are present in the end product in an amount of about 80% to about 99% by weight, preferably an amount of about 90% to about 98% by weight or about 94% by weight to about 97.5% by weight. Adhesive is preferably present in the end product in an amount of about 1% to about 20% by weight, about 2% to about 10% by weight, and about 2.5% to about 6% by weight.

In certain embodiments of the present invention two pre-polymer components are subjected to an ultrasonic field, to form microencapsulated adhesive droplets. In more preferred embodiments of the invention, the ultrasonic field is applied by feeding two pre-polymer components streams through an ultrasonic atomizer. Preferably, the ultrasonic frequency to which the two pre-polymer components is subjected is about 20 kHz to about 60 kHz, with a frequency of about 20 kHz to about 40 kHz being preferred. Generally, the two pre-polymer component streams are fed to the ultrasonic atomizer at any flow rate which is less than the stall rate when the atomizer is at maximum voltage input. Stall flow rate can vary depending on the combination of such factors as the viscosity of the two pre-polymer components, size of the delivery tubing, ultrasonic frequency and power input to the atomizer. Generally, it is preferred that the flow rate is as large as possible, while still below the stall rate. Suitable dual flow ultrasonic atomizers can be built using known designs and materials, or may be constructed using designs and materials to be developed in the art, and can also be obtained commercially from, for example, Sono-Tek, Milton, N.Y., Sonics, Newtown, Conn., and Cole-Parmer, Vernon Hills, Ill.

The two-component adhesive is applied in micro-encapsulated form to the plurality of material particles in the form of droplets. The droplets in general have a size distribution wherein a majority of the droplets have a diameter of from about 2 microns to about 200 microns. The adhesive droplets are applied to the selected material particles. This application may be accomplished by any means known or to be developed in the art. In certain embodiments, the adhesive may be atomized into a fine fog of resin droplets which are captured with a rotating or agitating container containing wood particles. As the adhesive droplets are applied, the container containing the wood particles may be rotated or agitated to ensure homogenous blending of the adhesive and the wood particles. Alternatively, the wood particles may be mixed or otherwise agitated by an additional apparatus such as a mixer.

Embodiments of the present invention permit greater flexibility in curing methods than would have been otherwise possible. Since they use phenol-aldehyde pre-polymer resins as an element of ambient or low temperature curing hybrid phenolic-polyurethane polymers, it may be used in applications where only more expensive resins such as resorcinol-formaldehyde or pure polyisocyanate would have to be used to provide the intended reactivity. In addition, by curing and forming adhesive bonds at low temperatures, especially in the production of wood composites, substantially less energy is required for cure. Also, with the lower cure temperatures and the more moisture tolerant polyisocyanate pre-polymer as an element of the polymer, bonding wood at higher than normal moisture content is possible. Under typical high moisture content wood bonding conditions of current industrial practice, PF resins tend to drop in viscosity during hot pressing due to the presence of extra moisture and penetrate into the wood substrate, leaving starved glue bonds, instead of properly forming the cohesive bond phase. Also, due to bond formation at significantly lower temperatures, panel delamination due to high steam pressure, commonly referred to as "blows", could be substantially reduced if not eliminated by the invention. Furthermore, since less drying of the wood furnish would be needed and lower press temperatures could be used, the levels of VOC's emitted during drying and pressing would also be reduced, providing a significant environmental benefit.

Use of the hybrid phenolic-polyurethane polymer as an adhesive binder system can be practiced in a variety of methods well known to those skilled in the art. Methods include such techniques as ambient temperature curing with or without pressure, radio frequency heating, conventional thermal conduction hot pressing, or steam injection pressing. Use of embodiments of the invention in a steam injection pressing environment would permit very efficient cure of the adhesive, especially in thick wood composite constructions such as those used in oriented strand lumber, parallel veneer strand lumber and scrim lumber. Steam injection has the significant advantage of delivering heat directly to the adhesive without needing to heat the wood substrate as must occur in conventional hot presses that operate by thermal conductivity. In addition, since the adhesive system of embodiments of the invention is so rapid curing, comparatively little steam heat would be required to cure it, permitting extremely fast press cycles and substantial productivity improvements. Furthermore, the use of steam injection also enables the production of wood composites with uniform density profiles and a resultant improvement in physical properties such as dimensional stability and thickness swell.

For steam injection pressing, all types of wood components, including strands, flakes, veneer, chips, fibers, wafers, particles, and the like, may be consolidated using the method. Green wood partially dried wood, or dried wood components may be used. Green wood is generally defined as wood having a moisture content of greater than 30 wt % based on the dry wood. Partially dried wood is generally defined as wood having a moisture content of between 10 and 30 wt %. Dried wood is generally defined as wood having a moisture content of less than 10 wt %.

In the production of particle-base composite lumber with steam injection pressing, a mat or stack of resin-coated wood components is exposed to a saturated or superheated steam atmosphere, typically at a temperature of about 100 to 190° C. and preferably at a temperature of about 100 to 120° C., in a hot press and the layup is compressed to form the consolidated wood product. The pressure is determined by the temperature of the saturated or superheated steam, and is generally between 15 and 180 psi. The steam may be injected into a sealed chamber of the hot press.

In steam injection pressing, steam is introduced into a mat of resin-treated wood components. The steam condenses inside the mat, heating it quickly and uniformly to a high temperature. This high temperature causes rapid curing of the resin and allows for short pressing cycles. The high temperatures are immediately available to the entire mat and the pressing time is essentially independent of mat thickness if a satisfactory quantity of steam is provided to the mat.

In one embodiment of the present invention, a press load can be prepared by treating wood strands having a moisture content of 10-20% with 10% resin solids of the inventive composition on the weight of the wood. An amount of the material which will give the target final board density is then loaded into the press. Saturated or superheated steam is introduced into the wood-resin mat to raise the temperature of the composition to 110° C. Concurrently, the mat is consolidated by press platens to obtain the desired wood composite thickness. The combination of temperature and pressure is maintained until the resin is cured.

The present invention will now be illustrated in more detail by reference to the following specific, constructive, non-limiting examples. These examples are illustrative in nature and represent a constructive reduction to practice.

EXAMPLES

Example 1

Preparation of a PF Pre-Polymer Resin

To a resin kettle are charged 608.6 g phenol (100%), 103.5 g sodium hydroxide (50%), and 200.0 g water under continuous agitation. To the mix, 897.3 g formalin (43.24%) is added over 30 minutes and then 200.0 g water is added. The temperature is increased to 60° C. and held for 30 minutes. Then 103.5 g sodium hydroxide (50%) and 137.2 g water are added and the temperature is increased to 85° C. for condensation. The PF pre-polymer resin is allowed to condense for another 60 minutes and then cooled to an end viscosity of about 30 cP (8.0 mL sample size, number 5 spindle, 12 rpm at 25.0° C.). The pre-polymer resin would have a pH of about 10.7 (Standard pH meter, calibrated to pH 7.00 and 11.00 read after 2.00 minutes at ambient temperature), a 100° C. gel time of 48.0 minutes, percent non-volatiles of about 44.3% (120° C. for 2 hours), a surface tension of 59.7 dyne/cm, $M_n$ of 528, $M_w$ of 839 and $M_w/M_n$ of 1.59 (GPC equipment with polystyrene standards).

Example 2

PF Pre-Polymer Resin with a Low Boiling Alcohol

The PF pre-polymer of example 1 is distilled to remove 784.5 g water which is replaced with 784.5 g methanol.

Example 3

PF Pre-Polymer Resin with a High Boiling Polyol

The PF pre-polymer of example 1 is distilled to remove 784.5 g water which is replaced with 784.5 g propylene glycol.

Example 4

Preparation of a PF Pre-Polymer Resin with Added Polyurethane Catalyst (Part A)

To each of the pre-polymer resins of examples 1, 2, and 3 is added 2.20 g of stannous chloride (0.10% concentration) which is then dissolved with agitation.

Example 5

Preparation of a Polyisocyanate Pre-Polymer with a PF Accelerator (Part B)

To 75.0 g of Probond polyurethane glue an MDI pre-polymer with diphenylmethane diisocyanate (Elmer's Products Inc., Columbus, Ohio) is added 25.0 g of propylene carbonate and the co-miscible liquids are mixed.

Example 6

Preparation of a Low Viscosity Polyisocyanate Pre-Polymer with a PF Accelerator (Part B)

To 75.0 g of Mondur ML (Bayer Material Science LLC, Pittsburg, Pa.), a mixture of 4,4' and 2,4' diphenylmethane diisocyanate and an MDI pre-polymer with a viscosity of 10 cP at 25 C, is added 25.0 g of propylene carbonate and the co-miscible liquids are mixed.

Example 7

Ambient Temperature Formation of a Hybrid PF-MDI Polymer

To 4.0 g of the three different Part A liquid samples as prepared in example 4 is added 1.0 g of the part B liquid samples prepared in example 6 and 7 at ambient temperature. Each mix is stirred quickly. All samples form a solid a solid mass within less than 5 minutes at ambient temperature.

Example 8

Preparation of Stable Adhesives by Ultrasonic Micro-Encapsulation of Part A and B Part A of example 4 with the aqueous PF pre-polymer of Example 1 is fed into the liquid A feed channel of a Sono-Tek dual liquid feed ultrasonic atomizer (Sono-Tek Corporation, Milton, N.Y.). Part B of example 5 or 6 is fed into the liquid B feed channel. Both Part A and Part B have a flow rate of about 1.5 mL/sec. At the atomizing surface, the liquids come together and are simultaneously subjected to an ultrasonic force, causing Part A to be micro-encapsulated in part B.

Example 9

Preparation of Stable Adhesives by Ultrasonic Micro-Encapsulation of Part A and B Part B of example 5 or 6 with the aqueous PF pre-polymer of Example 1 is fed into the liquid A feed channel of a Sono-Tek dual liquid feed ultrasonic atomizer (Sono-Tek Corporation, Milton, N.Y.). Part A of example 4 with the aqueous PF pre-polymer of Example 1 is fed into the liquid B feed channel. Both Part A and Part B have a flow rate of about 1.5 mL/sec. At the atomizing surface, the liquids come together and are simultaneously subjected to an ultrasonic force, causing Part B to be micro-encapsulated in part A.

Example 10

Application of Micro-Encapsulated Adhesive in a Conventional Hot Press

The stable micro-encapsulated adhesive of Part A in part B as described in example 8 is applied on wood strands immediately after atomization. The strands are compressed under conventional platen heat and pressure for 2 minutes to form a completely bonded wood composite.

Example 11

Application of Micro-Encapsulated Adhesive in a Steam Injection Press

The stable micro-encapsulated adhesive of Part A in part B as described in example 8 is applied on wood strands immediately after atomization. The strands are compressed in a steam injection press under heat and pressure for 30 seconds to form a completely bonded wood composite.

Example 12

Separate Application of Part A and Part B at Ambient Temperature to Form Glue-Laminated Lumber Part A of example 4 with the aqueous PF pre-polymer of Example 1 and Part B of example 5 are applied to the face of a piece of planed lumber in separate application as alternating strings at ambient temperature. A mating piece of planed lumber with no adhesive on it is pressed upon the surface of the other piece at ambient temperature, forcing the strings to flow and spread into each other. A hybrid PF-MDI polymer adhesive bond is formed and the pieces of lumber are bonded together within 30 minutes.

Example 13

Honeymoon Application of Part A and Part B at Ambient Temperature to Form Finger-Jointed Lumber Part A of example 4 with the aqueous PF pre-polymer of Example 1 of example 5 is applied to the finger joint of a piece of lumber in a honeymoon application at ambient temperature. A mating piece of finger-jointed lumber with Part B of example 5 applied to it is pressed into the mating surface of the other piece at ambient temperature, forcing the parts to flow and spread into each other. A hybrid PF-MDI polymer adhesive bond is formed and the pieces of lumber are bonded together within 30 minutes.

Example 14

Application with 2-Pack Polyurethane Equipment to Form I-Joists

Part A of example 4 with the aqueous PF pre-polymer of Example 1 and Part B of example 5 are applied with standard 2-pack polyurethane application equipment to the groove formed by the cavity of a piece of routed I-joist flange stock lumber at ambient temperature. A mating piece of wood web stock with no adhesive on it is pressed into the groove at ambient temperature, forcing the adhesive mixture to flow, spread, and wet the web stock. A hybrid PF-MDI polymer adhesive bond is formed and the pieces of lumber are bonded together within 30 minutes.

Example 15

Application by Impregnation of Part B and Part A

A 69 lb/1000 ft$^2$ sheet of Westvaco linerboard is impregnated with part B of example 6 to an oven dry resin content of 15 weight % on the sheet plus resin. Part A of example 4 with the aqueous PF pre-polymer of Example 1 is then coated equally on both surfaces of the linerboard to a total oven dry resin content of 29.2 weight % on the sheet plus both parts. Part A penetrates the capillary network of the web and comes into intimate contact with part B. Then, the water from part A is gently dried at 105° C. for one minute, also rapidly curing the now contacted parts A and B into a hybrid PF-MDI polymer.

Example 16

Application by Impregnation of Part A and Part B

A 132 lb/3000 ft$^2$ sheet of Westvaco Natural Kraft Saturating paper is impregnated with part A of example 4 with the methanol solvent base PF pre-polymer of Example 2 and the solvent from part A is gently dried at 105° C. for 30 seconds to an oven dry resin content of 20 weight % on the sheet plus resin. Part B of example 6 is then coated on the top surface of the paper web to a total oven dry resin content of 29.2 weight % on the sheet plus both parts. Part B penetrates the capillary network of the web and comes into intimate contact with part A, rapidly curing the now contacted parts A and B into a hybrid PF-MDI polymer.

Example 17

Application by Impregnation of Part A and Part B and Formation of High Pressure Laminate (HPL)

A 132 lb/3000 ft$^2$ sheet of Ohio Paperboard Recycled Natural Kraft Saturating paper is impregnated with part A of example 4 with the methanol solvent base PF pre-polymer of Example 2 and the solvent from part A is gently dried at 105° C. for 30 seconds to an oven dry resin content of 20 weight % on the sheet plus resin. Part B of example 6 is then coated on the top surface of the paper web to a total oven dry resin content of 35 weight % on the sheet plus both parts. Five sheets are laid up in this manner to limn a laminate assembly and a sixth sheet without Part B is laid on the top, followed by a seventh sheet of a fast curing melamine-formaldehyde impregnated decorative sheet. The assembly is placed under 160° C. heat and pressure for 30 seconds. Under pressure, Part B penetrates the capillary network of the web and comes into intimate contact with part A, rapidly curing the now contacted parts A and B into a hybrid PF-MDI polymer, while the decorative MF surface sheet bonds to the curing laminate assembly forming a fast curing HPL.

Example 18

Preparation of Part C

To 100.0 g of Zonyl BA-L fluoro-alcohol is added 0.1 g of Dibutyl-tin dilaurate (DBTL). The two materials are mixed to dissolve the DBTL in the Zonyl BA-L to form part C.

Example 19

Preparation of a No-Oil Concrete Form by Impregnation with Part A and Coating with Part B and Part C A 132 lb/3000 ft$^2$ sheet of Westvaco Natural Kraft Saturating paper is impregnated with part A of example 4 with the methanol solvent base PF pre-polymer of Example 2 and the solvent from part A is gently dried at 105° C. for 30 seconds to an oven dry resin content of 20 weight % on the sheet plus resin. Part B of example 6 is then coated on the top surface of the paper web to a total oven dry resin content of 29.2 weight % on the sheet plus both parts. Part B penetrates the capillary network of the web and comes into intimate contact with part A. The sheet is further coated with part C, rapidly curing the now contacted parts A and B into a hybrid PF-MDI polymer, while the now contacted parts B and C react to form a fluorinated polyisocyanate at the surface. The opposite or bottom surface of the sheet is coated with a PF glue-line resin and dried for 60 seconds at 105° C. to form a fluorinated surface treated no-oil concrete form overlay. The overlay is then bonded to the surface of a plywood panel to form the no-oil concrete foam panel.

Example 20

Preparation of a Chemical Resistant Wood Coating with Part A, Part B, and Part C A piece of laminated veneer lumber (LVL) is coated with part A of example 4 with the aqueous PF pre-polymer of Example 1 and the solvent from part A is gently dried at 105° C. for 60 seconds to remove the solvent. The LVL material is then coated with Part B of example 5 and then is further coated with part C, rapidly curing the now contacted parts A and B into a hybrid PF-MDI polymer, while the now contacted parts B and C react to form a fluorinated polyisocyanate in the surface layer of the coating. The coated LVL is now chemical and moisture resistant due to its fluorinated surface.

Example 21

Preparation of Part D and Application of Ambient Cure Fire Retardant Coating with Part B and Part D A part D is prepared by adding 50 g of MF resin and 10 g of Fyrol-51 phosphate fire retardant to 40 g of part A of example 4 with the aqueous PF pre-polymer of Example 1, followed by mixing to form a part D. Then 80 g of part D are combined with 20 g of part B from example 6 using the micro-encapsulation technique of example 8 or 9, or the 2-pack polyurethane equipment of example 14 to form an ambient temperature curing fire retardant coating.

Example 22

Application as a Metal Coating for Truck Bed Liners 80 g of the Part A of example 4 using the propylene glycol modified resin of example 3 is combined with 20 g of part B from example 6 using the micro-encapsulation technique of example 8 or 9, or the 2-pack polyurethane equipment of example 14 to form an ambient temperature curing metal coating primer for truck bed liners.

Experimental Embodiments & Unexpected Results

Embodiment 1

Preparation of PF Monomer Solution

In a 500 mL round bottom flask are placed 94.25 g phenol, 63.63 g paraformaldehyde (95%) and 56.9 g water. The round bottom flask is kept in a water cooling bath to avoid strong exothermic reaction and maintain the reaction solution at the ambient temperature of 25° C. Into the solution, 20.00 g of sodium hydroxide pellets are added individually over 30 minutes. These reactants are stirred with a magnetic stirrer until the paraformaldehyde dissolves in about 60 minutes. The maximum bath temperature is 26° C. and the maximum reaction temperature is 28° C. The reaction mixture is allowed to stand for another 19 hours at ambient temperature (23° C.) and then decanted and stored in a freezer. The yield of PF monomer solution is 289.07 g and has a pH of 11.0. Such a monomer solution is relatively slow reacting and would be expected to have a 100° C. gel time in the range of 65 to 95 minutes and can be stored at ambient temperature if necessary. Thus, such a material would not be useful in applications requiring fast reactivity.

Embodiment 2

Preparation of Part A PF Monomer-Polyurethane Catalyst Mix

In an 8 ounce Wheaton glass jar is placed 0.5012 g $SnCl_2 \cdot 2H_2O$ (Aldrich reagent grade, 98%), to which 0.6105 g of deionized water is added. These two components are mixed until the $SnCl_2 \cdot 2H_2O$ crystals dissolve. To the solution, 50.3677 g of PF monomer solution (F/P=2.00, NaOH/P=0.50) is added. Upon addition, tin oxide (SnO) precipitates but eventually dissolves upon further mixing after about 5 to 10 minutes as sodium stannite ($NaSn(OH)_3$) in solution. The PF monomer-polyurethane catalyst solution can be stored at ambient temperature.

Embodiment 3

Preparation of Part B Polyisocyanate Prepolymer-PF Accelerator Mix

In an 8 ounce Wheaton glass jar is placed 37.46 g polymeric MDI (Huntsman Rubinate® M, $f_n$=2.70, % NCO=31.2%, viscosity=190 cP, equivalent weight=135 g/mol), to which 12.11 g of propylene carbonate (PC, Aldrich ReagentPlus® grade, 99%) is added. These two components are mixed until a homogeneous, miscible liquid of a 3 to 1 weight ratio is formed. The miscible liquid is reasonably stable at ambient temperature for storage purposes.

Embodiment 4

Comparative Reaction of PF Monomer and Polyisocyanate Prepolymer 1.0 mL of PF monomer or PF monomer-polyurethane catalyst mixture are put in 15 mm×125 mm Pyrex® test tubes followed by 0.6 mL of polyisocyanate prepolymer or its mixture with PF accelerator. Formation of insoluble polymer solids is measured at 22° C., using a stop watch for each mixture. The results of polymer formation are shown in Table 1. The rapid formation of polymer from the unreactive PF monomer demonstrates the faster reactivity over conventional PF technology.

Embodiment 5

Reaction of PF Monomer and PF Accelerator 1.3551 g of PF monomer without $SnCl_2$ and 0.2002 g of propylene carbonate are mixed in a test tube at ambient temperature (22° C.) an allowed to stand with occasional mixing. Some reaction occurs as indicated by an opaque pink liquid that is more viscous than the starting monomer solution, but no insoluble polymer mass forms after 72 hours. The results are shown in Table 1.

Embodiment 6

Comparative Reaction of MDI and Polyurethane Catalyst

In a 15 mm×125 mm test tube, 0.0156 g $SnCl2 \cdot 2H_2O$ is dissolved in 0.0452 g deionized water. To this solution, 1.2542 g of Rubinate M is added and mixed at 22° C. The mixture thickens somewhat, but did not formed a solid mass after 240 minutes, nonetheless gelling in somewhere less than 20 hours. The results are shown in Table 1. These unexpected results, considered as a whole, illustrate the synergistic nature of the combined components, where all the components are necessary to achieve rapid gelation in comparison to individual components combined separately.

TABLE 1

Ambient Temperature Gel Times for PF Monomer and Polyisocyanate Prepolymer Component Combinations (3:1 ratio of MDI/PC)

| $SnCl_2$ | PF | PC | MDI | Gel Time @ 22° C. | Observations |
|---|---|---|---|---|---|
| 0 | X | X | 0 | Reacted, but no gel | Phase separated |
| X | 0 | 0 | X | >240' | Gelled in less than 20 hours |
| 0 | X | 0 | X | >960' | Phase separated mass |
| X | X | 0 | X | ~66' | Insoluble, viscous mass |
| 0 | X | X | X | 3'58" | Insoluble mass & liquid |
| X | X | X | X | 2'25" | Insoluble mass & liquid |
| $NH_3$ | X | X | X | 0'10" to 1'00" | Insoluble mass & red liquid |

Embodiment 7

Comparative Reaction of Part A and Part B 1.0 mL of the PF monomer-polyurethane catalyst mixture of embodiment 2 is put in a 15 mm×125 mm test tube, followed by 0.2 or 0.4 mL of MDI polyisocyanate prepolymer or the embodiment 3 mixture of it with PF accelerator at the 3 to 1 mix ratio. Insoluble polymer solid formation is measured at 22° C. using a stop watch for each combination. The results are shown in Table 2. These unexpected results show the synergistic effect of the components in combination.

TABLE 2

Gel Time of PF Monomer with Polyisocyanate prepolymer (1.0 mL PF and 0.2 or 0.4 mL of 3:1 MDI/PC component)

| $SnCl_2$ | PC | Volume MDI/PC | Gel Time @ 22° C. | Observations |
|---|---|---|---|---|
| 0 | X | 0.2 mL | 3'30" | Insoluble, viscous mass |
| X | X | 0.2 mL | 2'08" | Insoluble, viscous mass |
| 0 | X | 0.4 mL | 2'01" | Insoluble mass & liquid |
| X | X | 0.4 mL | 1'58" | Insoluble mass & liquid |

Embodiment 8

Preparation of Part B Polyisocyanate Prepolymer-PF Accelerator Mixture

In an 8 ounce Wheaton glass jar 90.0 g of Huntsman Rubinate® M polymeric MDI is placed, to which 10.0 g of propylene carbonate is added. These two components are mixed until a homogeneous liquid of 9 to 1 weight ratio is formed.

Embodiment 9

Reaction of PF Monomer without and with Polyurethane Catalyst (Part A) and 9 to 1 Ratio Polyisocyanate Prepolymer-PF Accelerator Mixture (Part B)

Into a 15 mm×125 mm test tube 1.0 mL of the PF monomer-polyurethane catalyst mixture of embodiment 2 is placed, followed by 0.2, 0.4, or 0.6 mL of polyisocyanate prepolymer alone or the mixture of embodiment 8. Formation of insoluble polymer solids is measured at 22° C. using a stop watch for each mixture. The results of polymer formation are shown in Table 3.

TABLE 3

Gel Time of PF Monomer with Polyisocyanate prepolymer (1.0 mL PF and 0.2 and 0.4 mL of 9:1 MDI/PC component)

| mL MDI mix | $SnCl_2$ | PC | Gel Time @ 22° C. | Observations |
|---|---|---|---|---|
| 0.2 | 0 | X | >200' | Insoluble + liquid |
| 0.2 | X | X | >15' | Insoluble + liquid |
| 0.4 | 0 | X | 21'32" | Insoluble mass |
| 0.4 | X | X | 6'22" | Insoluble mass |
| 0.6 | 0 | X | 7'15" | Insoluble mass |
| 0.6 | X | X | 3'51" | Insoluble mass |

A graph illustrating the synergistic effect of the PF accelerator and polyurethane catalyst is shown in FIG. 3. The combination of $SnCl_2$ and PC at the 0.4 mL add rate has an unexpected lower gel time than the 0.6 mL add rate without $SnCl_2$, demonstrating the synergy of this two component system and its utility for rapid cure with lower amounts of the costly polyisocyanate, MDI.

The gel time reactions shown in FIG. 4 further illustrate the synergistic effect of the inventive system with the 9 to 1 mixture of MDI and PC PF accelerator with the PF monomer containing polyurethane catalyst solution. The gel times were acquired by adding 0.6 mL of the MDI component to 1.0 mL of the PF component.

Embodiment 10

Differential Scanning Calorimetry (DSC)

Running DSC on ambient temperature reacting materials is difficult due to the problem of combining the materials without causing them to react until the experiment is started. In order to minimize this issue, the PF resin component was freeze dried using a Millrock Technologies Opti-dry Benchtop Freeze Dryer and pulverized to a high solid content powder. Samples of the PF monomer with and without $SnCl_2$ (approximately 20 g liquid each) were placed in a suitable flask, frozen by exposing the flask to liquid nitrogen, and exposed to 30 mT vacuum at −50° C. for approximately 24 hours to remove water. Due to the resulting solids being too tacky to pulverize, the material was re-dissolved in methanol, evaporated to near dryness under ambient conditions, then freeze dried under 30 mT vacuum at −50° C. for about another 24 hours. The samples were removed and pulverized with a mortar and pestle then stored in a vial.

Figure 6:
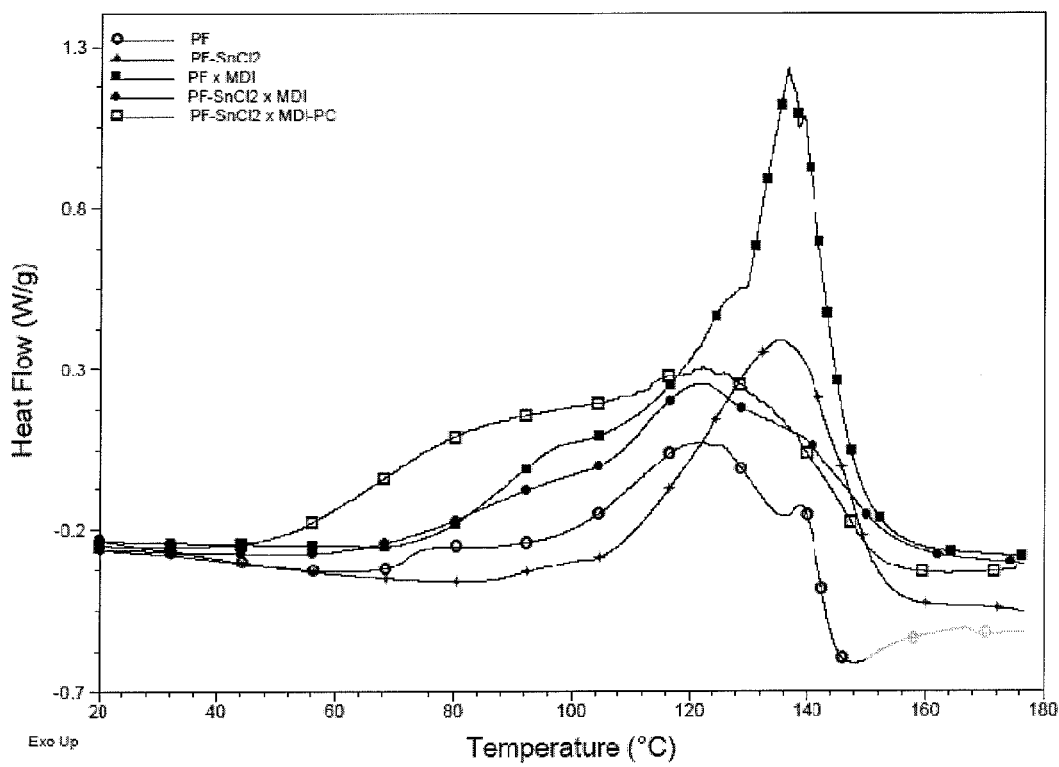
FIG. 6 illustrates the synergistic improvement in reactivity of a composition over its components with DSC scanning.
Figure 7:
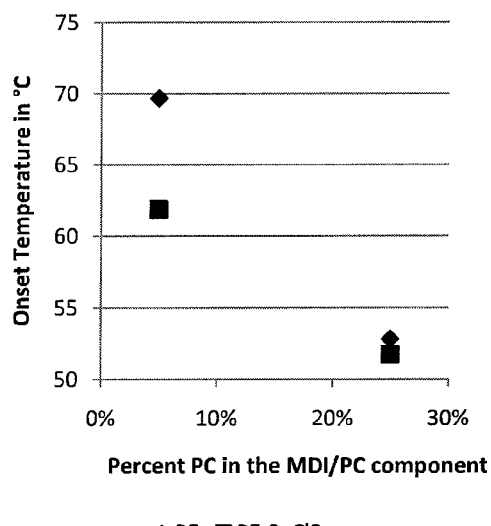
FIG. 7 shows the effect of a composition on reaction onset temperature as shown by DSC scanning.

In order to minimize undesirable pre-reaction, the powdered PF component is gently combined with the liquid MDI/PF accelerator component in the DSC sample pan, a compromise leading to a heterogeneous composition that likely resulted in less co-reactions occurring than would do so with complete mixing. Co-reactions would be limited to the surfaces of interfacial interaction. Nonetheless, the DSC scans provide useful information demonstrating the unexpected synergistic effect of the combined components. The scans were run on a TA Instruments DSC Q100 using hermetically sealed aluminum pans with a thermal program of cooling to 0° C. for equilibration then heating to 180° C. at a ramp rate of 10° C./minute. Although such a rapid heating rate does exhibit thermal lag with the resulting appearance of peaks occurring at higher temperatures, the resulting heat flows still provide useful information about the reactivity of the compositions. Graphical results for the scans are shown in FIG. 6. The results of FIG. 6 clearly show the synergistic effect of the polyurethane catalyst, PF accelerator, and MDI in combination with the PF monomer compared to the components alone, with the lowest onset temperature of the group. Some of the higher temperature reactions may be attributed to sample heterogeneity within the solid-liquid mixture.

Table 4 provides data on the sample proportions for two combinations of MDI and PC liquid and PF monomer powder with and without $SnCl_2$. A mix of 3.4483 g MDI and 0.1831 g PC (19 to 1 wt ratio) was used. The onset temperatures illustrate the unexpected synergistic effects of combined components at low proportions of the accelerator.

TABLE 4

DSC of PF Monomer and Polyisocyanate Prepolymer with PF Accelerator Component ratios (3:1 and 19:1)

| $SnCl_2$ | PF | PC/MDI | PC:MDI | Wt % PF | Wt % MDI | Wt % PC | Onset Temp. |
|---|---|---|---|---|---|---|---|
| 0 | X | X | 3:1 | 47.7% | 39.2% | 13.1% | 51.7° C. |
| X | X | X | 3:1 | 50.6% | 37.1% | 12.4% | 52.8° C. |
| 0 | X | X | 19:1 | 44.7% | 52.6% | 2.8% | 69.7° C. |
| X | X | X | 19:1 | 51.7% | 45.9% | 2.4% | 61.9° C. |

Embodiment 11

Preparation of $NH_4OH$ Modified PF-Polyurethane catalyst Mixtures as Part A and Reaction with Part B Mixtures In an 25 mL sample vial is placed 6.5232 g of the PF monomer solution (F/P=2.00, NaOH/P=0.50) to which 0.6990 g of 25% ammonium hydroxide is added as a polyurethane catalyst. These two components are mixed and allowed to stand at 22° C. for at least 16 hours. To 1.1345 g (1.0 mL) of this PF monomer-ammonium hydroxide solution is added 0.7477 g (0.6 mL) of MDI/PC at the 3 to 1 weight ratio of embodiment 3. The two components are mixed in a 20×150 mm Pyrex® test tube with a 250 mm×6 mm Teflon® coated stirring rod at 22° C. Insoluble polymeric solids form in 10 to 15 seconds, with the formation of a viscous mass on the stirring rod between 30 and 35 seconds. The reaction appears to be complete with by approximately 60 seconds with a residual red liquid phase. To 2.0 mL of this PF monomer-ammonium hydroxide solution is added 0.6 mL of MDI/PC at a 3 to 1 weight ratio. The two components are mixed with a thermometer to induce a reaction that generates sufficient heat to raise the temperature from 22 to 59° C.

TABLE 5

Gel Time of 1.0 mL commercial PF resin treated with 25% $NH_3OH$ as a polyurethane catalyst with polyisocyanate mixed with PC as a PF accelerator

| MDI:PC ratio | Wt % MDI | Gel Time in seconds at 22° C. for MDI/PC volume | | | |
|---|---|---|---|---|---|
| | | 0.2 mL | 0.4 mL | 0.6 mL | 0.6 mL (no $NH_3OH$) |
| 3:1 | 75 | 182 | 52 | 32 | 50 |
| 9:1 | 90 | 1998 | 133 | 66 | 93 |
| 19:1 | 95 | 9030 | 563 | 163 | 196 |
| 1:0 | 100 | >147600 | 5078 | 900 | >28800 |

Figure 9:
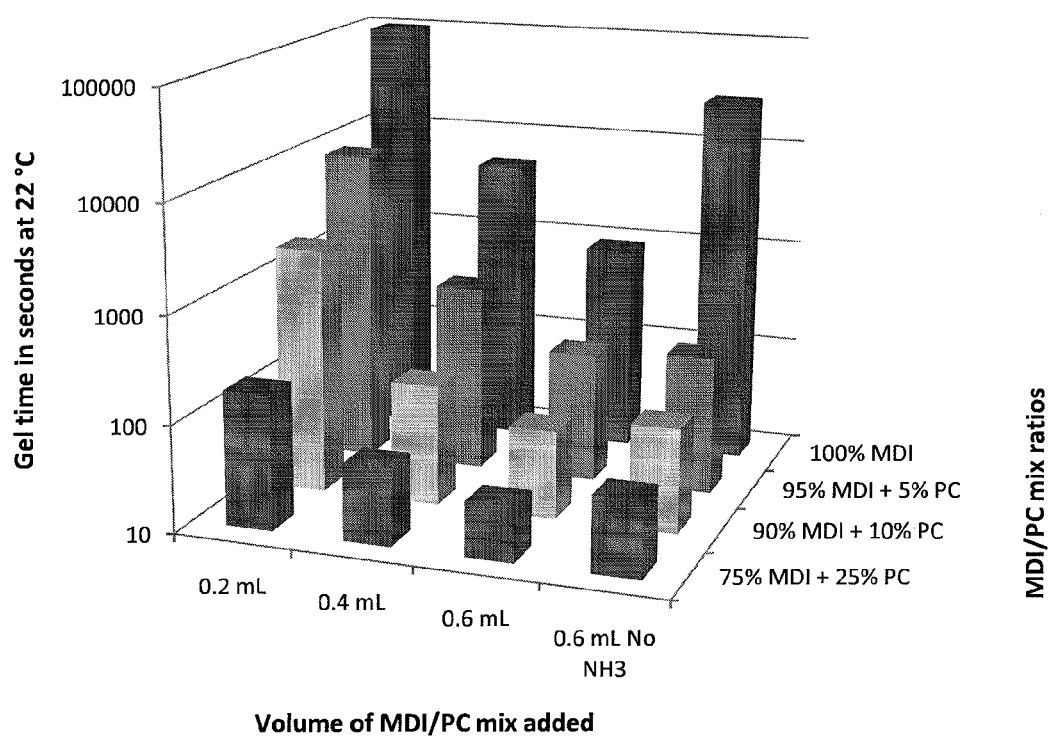
FIG. 9 depicts the synergistic effect of using ammonia as a polyurethane catalyst in conjunction with propylene carbonate as an accelerator.

In another 25 mL sample vial is placed 19.5092 g of a commercial PF OSB core resin (~300 cP viscosity, pH≈12.7, ~50% non-volatiles) to which 1.0308 g of 25% ammonium hydroxide is added as a polyurethane catalyst. These two components are mixed at 22° C., but used immediately. In another 25 mL sample vial is placed 3.4483 g of the commercial Rubinate M MDI to which 0.1831 g of propylene carbonate is added as a PF accelerator for a nominal ratio of 19 to 1 or 95% MDI by weight. Ambient temperature gel times are taken at 22° C. using neat MDI, and the MDI/PC mixes in the ratios of 3 to 1, 9 to 1, and 19 to 1 of embodiments 3, 8, and 10. Volumes of materials used are 1.0 mL of this PF resin-polyurethane catalyst component and 0.2, 0.4, or 0.6 mL of the polyisocyanate-PF accelerator mixes with a comparative example of 1.0 mL of PF resin without $NH_3OH$ as polyurethane catalyst and 0.6 mL of the polyisocyanate-PF accelerator mixes. The two components are mixed in a 20×150 mm Pyrex® test tube with a 250 mm×6 mm Teflon® coated stirring rod at 22° C. The unexpected synergistic effect of the combination is shown by the gel time results in Table 5 and FIG. 9.

Embodiment 12

Compositions Made with Commercial Preparations Use to Make Part A and Part B Mixtures The inventive composition was made using Gorilla Glue (40-50% trade secret Urethane prepolymer & 50-60% Polymeric MDI, a mixture of 4,4'-Diphenylmethane-diisocyanate, isomers and homologues) and the same commercial PF OSB core resin used in embodiment 11. The polyisocyanate prepolymer component was prepared by mixing 1.04 g PC in 24.02 g of Gorilla Glue. The PF prepolymer component was prepared by dissolving 0.4997 g $SnCl_2.2H_2O$ in 1.1366 g of deionized water. To this solution, 55.79 g of PF resin is added. Gel time samples of varied proportions are prepared and placed in a 25 mm×150 mm glass test tube according to the schedule in Table 6. Gel times are measured with a stopwatch while stirring the mixture at 25° C.

TABLE 6

Gel Times for Preparation of Commercial Compositions of a PF resin with a Polyurethane Catalyst and MDI with a PF Accelerator

| Sample | Wt PF/ Catalyst | Wt MDI/PF Accelerator | MDI/PC % wt of Total | Gel Time @ 25° C. in Seconds |
|---|---|---|---|---|
| 1 | 3.33 g | 3.39 g | 57.6% | ~30 |
| 2 | 3.02 g | 1.02 g | 25.3% | ~60 |
| 3 | 3.03 g | 0.61 g | 16.8% | ~105 |
| 4 | 6.01 g | 0.54 g | 8.2% | ~330 |
| 5 | 6.06 g | 0.26 g | 4.1% | ~3300 |

The plot of gel time against percent MDI/PF accelerator component in FIG. 5 illustrates the ability to achieve rapid polymer formation even at low proportions of the components. Conversely, the plot also demonstrates that by varying the component proportions in the composition that the gel time can be usefully controlled when longer assembly time is needed.

Embodiment 13

Preparation of Part A PF Monomer with Polyurethane Catalyst for Paper Impregnation In an 8 ounce Wheaton glass jar is placed 0.5012 g $SnCl_2.2H_2O$ (Aldrich reagent grade, 98%), to which 75.0 g of reagent grade methanol is added, with mixing until the $SnCl_2.2H_2O$ crystals dissolve. To this solution, 50.0 g of the PF monomer solution of embodiment 2 is added. Upon addition, tin oxide (SnO) precipitates and upon further mixing it eventually dissolves after about 5 to 10 minutes as sodium stannite ($NaSn(OH)_3$) in solution.

Embodiment 14

Preparation of Part B Polyisocyanate Prepolymer with PF Accelerator for Paper Impregnation In an 8 ounce Wheaton glass jar 30.0 g of the 9 to 1 MDI/PC mix of embodiment 8 is placed, to which 30.0 g of acetone is added. These two components are mixed until a homogeneous liquid is formed.

Embodiment 15

Preparation of Part C Fluorinated Alcohol and Polyurethane Catalyst Solutions in Acetone In an 8 ounce Wheaton glass jar 1.0454 g of octafluoropentanol is placed, to which 0.0991 g of dibutyltindilaurate polyurethane catalyst and 24.3358 g of acetone is added. These three components are mixed until a homogeneous liquid is formed.

In an 8 ounce Wheaton glass jar 2.0062 g of perfluorodecanol is placed, to which 0.1103 g of dibutyltindilaurate polyurethane catalyst and 24.1478 g of acetone is added. These three components are mixed until a homogeneous fluid is formed. Samples of Whatman filter paper 125 mm in diameter are treated with the solutions listed in Table 7. After curing at ambient temperature overnight, droplets of water are placed on them and contact angles were ranked visually. Ambient temperature was 22° C., although ambient temperature in a typical paper impregnation facility might range from 10 to 45° C.

TABLE 7

Paper Filter Discs Treated with PF Monomer/Polyurethane Catalyst, Isocyanate Prepolymer/PF Accelerator, and Fluorinated Alcohol/DBTL

| Sample (Order) | Average wt of 2 Paper samples | ~PF Monomer/ $SnCl_2$ wt | ~MDI/PC (3:1 mix) wt | F alcohol treatment | Water Drop Test Results & Visual Contact Angle Ranking (Best = 1) |
|---|---|---|---|---|---|
| 1 (PF/MDI) | 1.16 g | 0.38 g | 1.95 g | No | Higher angle (2) |
| 2 (PF/MDI) | 1.24 g | 0.60 g | 1.99 g | Yes | Lower angle (3) |
| 3 (PF/MDI) | 1.23 g | 0.70 g | 1.99 g | Yes | Beads up (1) |
| 4 (MDI/PF) | 1.23 g | 0.32 g | 0.70 g | No | Lowest angle (4) |

Embodiment 16

Surface Treatment of Wood with Part C Fluorinated Alcohol

Figure 8:
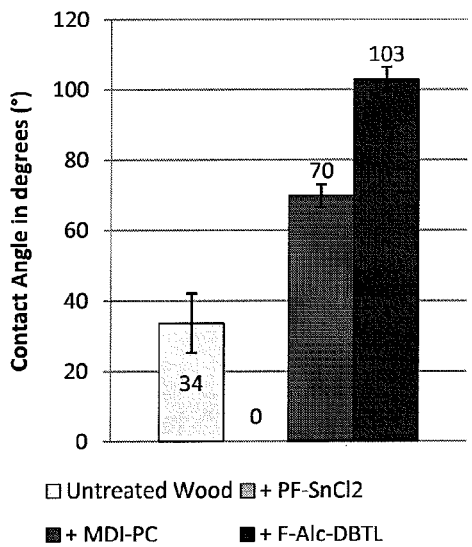
FIG. 8 illustrates the creation of a hydrophobic surface using a fluorinated alcohol.

Solutions of 0.9359 g PF monomer with SnCl2 and 1.2076 g methanol, and 1.7350 g MDI/PC (3/1 ratio) with 1.9322 g Acetone are prepared. The tangential surface of a strip of southern yellow pine wood 255 mm long by 11.0 mm wide is marked off into four 59 mm long sections. Section 1 remains untreated. Sections 2, 3, and 4 are treated with the PF monomer SnCl2 solution and allowed to air dry (53 droplets). Sections 3 and 4 are then treated with the MDI/PC/acetone solution (35 droplets), and rubbed in with a Teflon coated stirring rod, with excess scraped off after 25 minutes. Section 4 is then treated with the perfluorodecanol solution (5 droplets) and rubbed in and the coated assembly is allowed to cure at ambient temperature for at least 24 hours. Section 4 is wiped with a tissue saturated in acetone to remove any unreacted or soluble perfluorodecanol. Five droplets of ordinary tap water are placed onto each section and a digital image is created after 75 seconds elapsed time. The digital image is then analyzed using computer software to estimate the contact angle of the droplet on the surface. The resulting measurements are given in Table 8. Treatment with the PF/SnCl2 component alone provides a surface that wets immediately with water and treatment with the MDI creates a water-repellant surface with a contact angle less than 90°, while treatment with perfluorodecanol creates a hydrophobic surface with a contact angle greater than 90°. The results (see FIG. 8) illustrate the unexpected superiority of a hydrophobic wood coating that substantially improves the hydrophobic properties of the wood more than the other components would do alone.

TABLE 8

Average Contact Angle of 5 Water Droplets on Wood Treated with part A, part B, and part C of the Inventive Composition

| Contact Angle Measure | Untreated | A | A + B | A + B + C |
|---|---|---|---|---|
| Average Contact Angle | 34° | 0° | 70° | 103° |
| Standard Deviation | 8.4° | 0.0° | 3.2° | 3.5° |
| Coefficient of Variation | 25.1% | — | 4.6% | 3.4% |

Embodiment 17

Preparation of Part A PF Prepolymer-Polyurethane Catalyst Component for Wood Adhesives The PF prepolymer component was prepared by placing 2.5 g $SnCl_2.2H_2O$ in 5.1 g of deionized water in an 8 ounce Wheaton glass jar and mixing until the $SnCl_2.2H_2O$ crystals dissolve. To this solution, 250.2 g of the PF OSB core type resin of embodiment 11 is added. Since the $SnCl_2$ precipitated, an additional 1.5 g of 0.1 N sodium hydroxide solution and an additional 2.1 g of sodium hydroxide prills were added to the resin to aid dissolution of precipitate. The material was mixed with a magnetic stir bar and stir plate for 24 hours to achieve dissolution. This need for dissolution of the precipitate of $SnCl_2 \cdot 2H_2O$ points to the desirability of pre-dissolving it in the resin during the resin production process, or to formation of a solution using an aqueous alkali hydroxide solution, so that a homogeneous resin-polyurethane catalyst component solution may be quickly formed.

Embodiment 18

Ambient Cure Assembly and Adhesive Bonding of LVL

Eleven yellow poplar veneer samples with dimensions of 15.2 cm in the length of the grain, 12.7 cm across the grain, and 4 mm thickness are used to fabricate a small sample in the manner of laminated veneer lumber. To ten of the veneer pieces 4.6 mL (~5.6 g) of the PF-polyurethane catalyst component of embodiment 17 is placed on the veneer in a pool, followed by 0.4 mL (~0.5 g) of the MDI/PF accelerator mixture of embodiment 8 at the 9 to 1 ratio. Ambient temperature was 23° C., although ambient temperature in a wood composite facility might range from 15 to 40° C. The two components are mixed by hand on each piece using a Teflon® coated stir bar, spreading the mix evenly over the surface of the veneer, then composed into an LVL assembly. When the ten pieces are complete, the eleventh, uncoated veneer piece is placed on the top of the assembly. Adhesive mixing and assembly took approximately 7 minutes. After assembly, the wood-adhesive composition is placed in an unheated 15.24 cm by 15.24 cm Carver press and placed under approximately 4500 kg load for 10 minutes. After 10 minutes an LVL sample piece 41 mm thick is removed, without any delamination after pressing.

Embodiment 19

Ambient Cure Assembly and Adhesive Bonding of Glulam

Pine wood pieces with dimensions of 15.2 cm in the length of the grain, 12.7 cm across the grain, and 3.4 cm thickness are used to fabricate a small sample in the manner of glue laminated lumber. On the large surface of the wood, 4.0 mL (~4.8 g) of the PF-polyurethane catalyst component of embodiment 17 is placed on the wood surface, followed by 2.0 mL (~0.5 g) of the MDI/PF accelerator mixture of embodiment 8 at the 9 to 1 ratio. Ambient temperature was 23° C. V Various glue application configurations such as strings, dots, and honeymoon (opposing surfaces) are used. A second piece of pine wood is pressed by hand onto the first surface, moving the two pieces back and forth so as to mix the two adhesive components in situ. After approximately 30 to 45 seconds, the blocks are positioned and placed in a C-clamp assembly to hold them together. The first assembly which was positioned in 45 seconds was released after 4 minutes. It broke apart due to premature hardening of the adhesive before it properly wet both pieces. The second and third assemblies were therefore positioned in less than 30 seconds after mixing of the adhesive components in order to avoid premature hardening, then clamped and released after approximately 30 minutes. These samples did not break apart after releasing them from the clamps but formed a block of composite wood resembling the glulam type construction. These examples show that the composition will bond wood at ambient temperature if the work pieces are properly positioned prior to application of pressure and hardening.

The various embodiments described above are provided by way of illustration only and should not be construed to limit the invention. Based upon the above discussion and illustrations, those skilled in the art will readily recognize that various modifications and changes may be made to the present invention without strictly following the exemplary embodiments and applications illustrated and described herein. Such modifications and changes do not depart from the true spirit and scope of the present invention, including that set forth in the following claims.

What is claimed is:

1. A method for forming a hybrid polymer composition, comprising the steps of:
    preparing a first part that includes a phenol-aldehyde pre-polymer and a polyurethane catalyst;
    preparing a second part that includes a polyisocyanate pre-polymer and a phenol-aldehyde cure accelerator;
    combining the first part and the second part to form a hybrid pre-polymer composition; and
    thereafter applying the hybrid pre-polymer composition to a substrate material that includes cellulose, lignocellulose, and combinations thereof, inducing reaction of the hybrid pre-polymer composition to form the hybrid polymer composition, including curing the applied hybrid pre-polymer composition to form the hybrid polymer composition, wherein said hybrid pre-polymer composition has a gel time, as measured from the mixture of the pre-polymer composition, of less than about 9000 seconds at ambient temperature.

2. The method of claim 1, whereby the step of combining the first part and the second part to form a hybrid pre-polymer composition is performed by microencapsulating the first part in the second part, or alternatively, by microencapsulating the second part in the first part to form said hybrid pre-polymer composition.

3. The method of claim 1, whereby the reaction of said hybrid pre-polymer composition is induced by mixing, by pressure, by applying heat, or combinations thereof.

4. The method of claim 1, wherein the polyurethane catalyst is selected from a group consisting of: Lewis bases, Lewis acids, insertion catalysts, metal catalysts, alkali metal salts of organic acids and phenols, and mixtures thereof 5. The method of claim 1, wherein the polyisocyanate pre-polymer is at least a monomer of diphenylmethane diisocyanate and has at least two isocyanate functional groups.

6. The method of claim 1, wherein the phenol-aldehyde resin cure accelerator is selected from a group consisting of: lactones, organic carbonates, carboxylic acid esters; ammonia reaction products of lactones, organic carbonates, carboxylic acid esters; and mixtures thereof.

7. The method of claim 1, wherein the gel time is less than about 3300 seconds at ambient temperature.

8. The method of claim 1, wherein the gel time is less than about 2000 seconds at ambient temperature.

9. The method of claim 1, wherein the gel time is less than about 600 seconds at ambient temperature.

10. The method of claim 1, wherein the gel time is less than about 180 seconds at ambient temperature.

11. The method of claim 1, wherein the gel time is less than about 60 seconds at ambient temperature.

12. The method of claim 1 wherein said phenol-aldehyde pre-polymer is selected from the group consisting of: aqueous and powdered resoles wherein said aqueous resoles may have a portion of their water substituted by aliphatic alcohols, diols, triols, or mixtures thereof.

13. The method of claim 1 wherein said hybrid polymer composition is used for the manufacture of: lignocellulosic composites selected from a group consisting of: plywood, laminated veneer lumber, oriented strandboard, oriented strand lumber, parallel strand lumber, scrim strand lumber, particle board, medium density fiberboard, high density fiberboard, and hardboard, wherein said lignocellulosic composites further including veneers, overlays, low pressure laminates, and high pressure laminates; finger jointed lumber, I joists, glue laminated lumber, overlays, and high pressure laminate;

a fibrous web composite further comprising a fibrous web material and said hybrid polymer composition, wherein the fibrous web material is selected from a group consisting of: cellulose, glass fiber, carbon fiber, synthetic organic fiber, and combinations thereof.

* * * * *

UNITED STATES PATENT AND TRADEMARK OFFICE
CERTIFICATE OF CORRECTION

PATENT NO.        : 8,865,287 B2                                              Page 1 of 1
APPLICATION NO.   : 13/058702
DATED             : October 21, 2014
INVENTOR(S)       : Haupt It is certified that error appears in the above-identified patent and that said Letters Patent is hereby corrected as shown below:

In the Claims

Col. 33, line 7, Claim 13: "laminates; finger" should read --laminates, finger--.

Col. 33, line 8, Claim 13: "laminated lumber, overlays, and high" should read --laminated lumber and high--.

Signed and Sealed this
Twenty-ninth Day of December, 2015

Michelle K. Lee
*Director of the United States Patent and Trademark Office*